US008229004B2

(12) United States Patent
Ishii

(10) Patent No.: US 8,229,004 B2
(45) Date of Patent: Jul. 24, 2012

(54) IMAGE SIGNAL PROCESSING APPARATUS WITH CODE AMOUNT CONTROL FOR INTER-FRAME AND INTRA-FRAME ENCODING

(75) Inventor: Yoshiki Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 12/093,126

(22) PCT Filed: Nov. 8, 2006

(86) PCT No.: PCT/JP2006/322690

§ 371 (c)(1), (2), (4) Date: May 8, 2008

(87) PCT Pub. No.: WO2007/055389

PCT Pub. Date: May 18, 2007

(65) Prior Publication Data

US 2009/0096883 A1 Apr. 16, 2009

(30) Foreign Application Priority Data

Nov. 9, 2005 (JP) ................................ 2005-324784

(51) Int. Cl.
*H04N 7/26* (2006.01)

(52) U.S. Cl. .......... 375/240.26; 375/240.12; 375/240.13

(58) Field of Classification Search ............. 375/240.12, 375/240.13, 240.26
See application file for complete search history.

(56) References Cited

U.S. PATENT DOCUMENTS 5,325,374 A 6/1994 Hoshi et al. ..................... 371/43
5,905,578 A 5/1999 Fujii et al. .................. 358/262.1
6,052,159 A 4/2000 Ishii et al. .................. 348/845.1
6,055,664 A 4/2000 Ishii et al. ..................... 714/763
6,219,157 B1 4/2001 Shikakura et al. ............ 358/433
6,473,879 B1 10/2002 Ishii et al. ..................... 714/769
(Continued)

FOREIGN PATENT DOCUMENTS

JP 9-261631 A 10/1997
(Continued)

OTHER PUBLICATIONS

Coded Representation of Picture and Audio Information, Document AVC-491B, Version 2: Apr. 1993, Geneva, ISO, CH, 1993, pp. 1-119, XP001150695.

(Continued)

*Primary Examiner* — Chi Pham
*Assistant Examiner* — Siming Liu
(74) *Attorney, Agent, or Firm* — Fitzpatrick, Cella, Harper & Scinto

(57) ABSTRACT

An object of this invention is to effectively reduce a luminance flicker caused by noise while suppressing an adverse effect such as an afterimage and a decrease in the resolution upon smoothing as much as possible even when the S/N ratio of an image photographed at an increased gain is low. An image signal processing apparatus includes a smoothing circuit (124) to execute smoothing processing of an image signal, a compression encoding circuit (112, 113) to compression-encode the image signal, a setting circuit (126) capable of setting, for the compression encoding circuit, the code amount for each picture type, and a control circuit (116) that controls in accordance with a gain setting value acquired from a camera (102) to change the intensity of smoothing processing and the assignment ratio of code amount for each picture type.

16 Claims, 17 Drawing Sheets

U.S. PATENT DOCUMENTS 6,718,122 B1 4/2004 Ishii et al. .................... 386/112
2004/0008772 A1 1/2004 Kojima
2005/0175096 A1* 8/2005 Lee .......................... 375/240.03
2005/0226526 A1* 10/2005 Mitsunaga .................... 382/274

FOREIGN PATENT DOCUMENTS

JP 2003-219366 * 7/2003
JP 2003-219366 A 7/2003
WO 97/05745 2/1997
WO 2006/090755 8/2006
WO 2007/055389 5/2007
WO 2007/055389 A2 5/2007
WO 2007/055389 A3 5/2007

OTHER PUBLICATIONS

Apr. 23, 2007 PCT International Search Report and Written Opinion of the International Searching Authority.

* cited by examiner

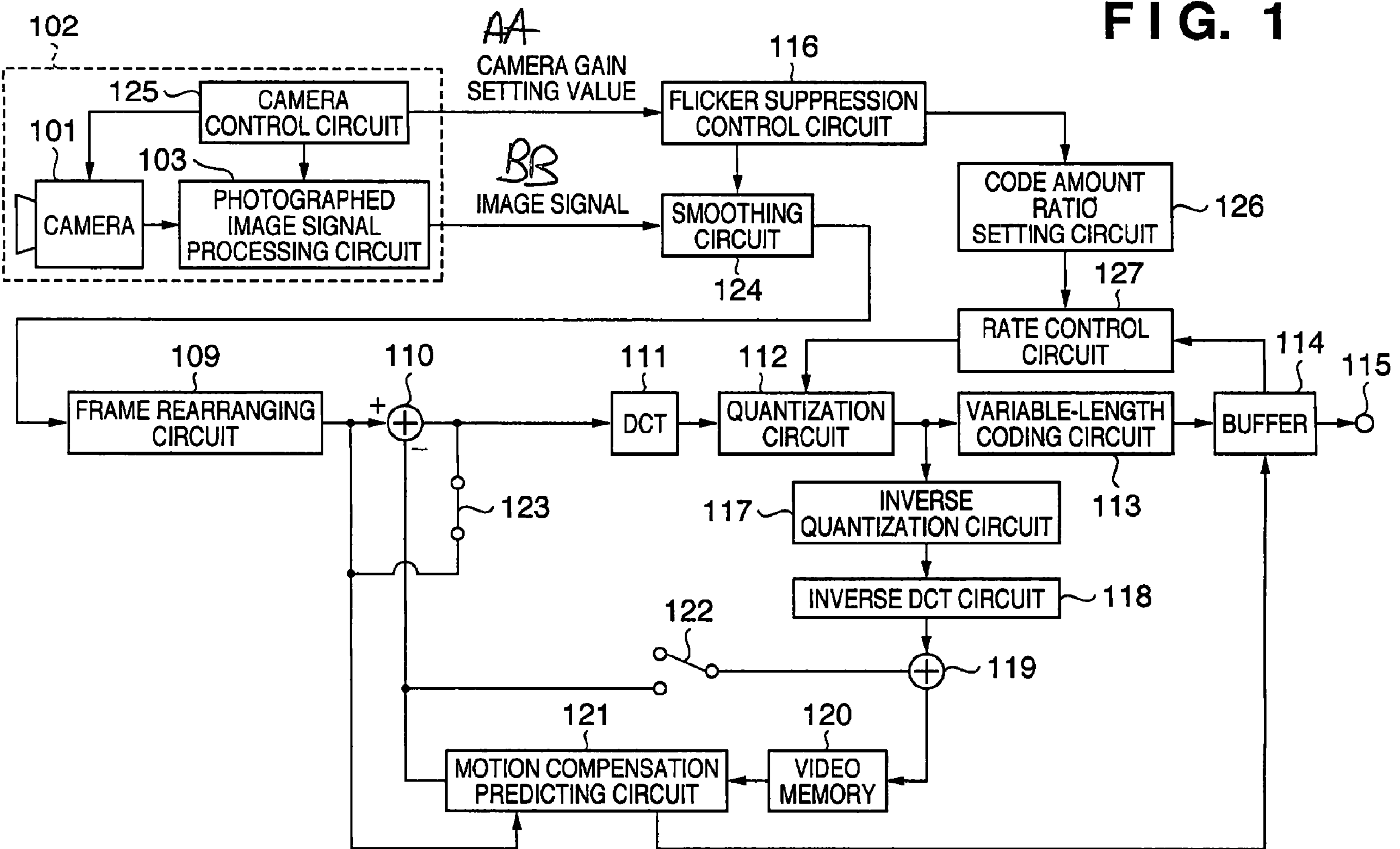
F I G. 1
102
125
CAMERA CONTROL CIRCUIT
101
CAMERA
103
PHOTOGRAPHED IMAGE SIGNAL PROCESSING CIRCUIT
AA
CAMERA GAIN SETTING VALUE
BB
IMAGE SIGNAL
116
FLICKER SUPPRESSION CONTROL CIRCUIT
SMOOTHING CIRCUIT
124
CODE AMOUNT RATIO SETTING CIRCUIT
126
127
RATE CONTROL CIRCUIT
109
FRAME REARRANGING CIRCUIT
110
+
−
111
DCT
112
QUANTIZATION CIRCUIT
VARIABLE-LENGTH CODING CIRCUIT
113
114
BUFFER
115
123
117
INVERSE QUANTIZATION CIRCUIT
INVERSE DCT CIRCUIT
118
122
119
121
MOTION COMPENSATION PREDICTING CIRCUIT
120
VIDEO MEMORY SMOOTHING INTENSITY
-3
0dB
+3
+6
+9
+12
+15 CAMERA GAIN
a
SIGNAL GAIN
0dB
SPATIAL FREQUENCY
b
L401
L402

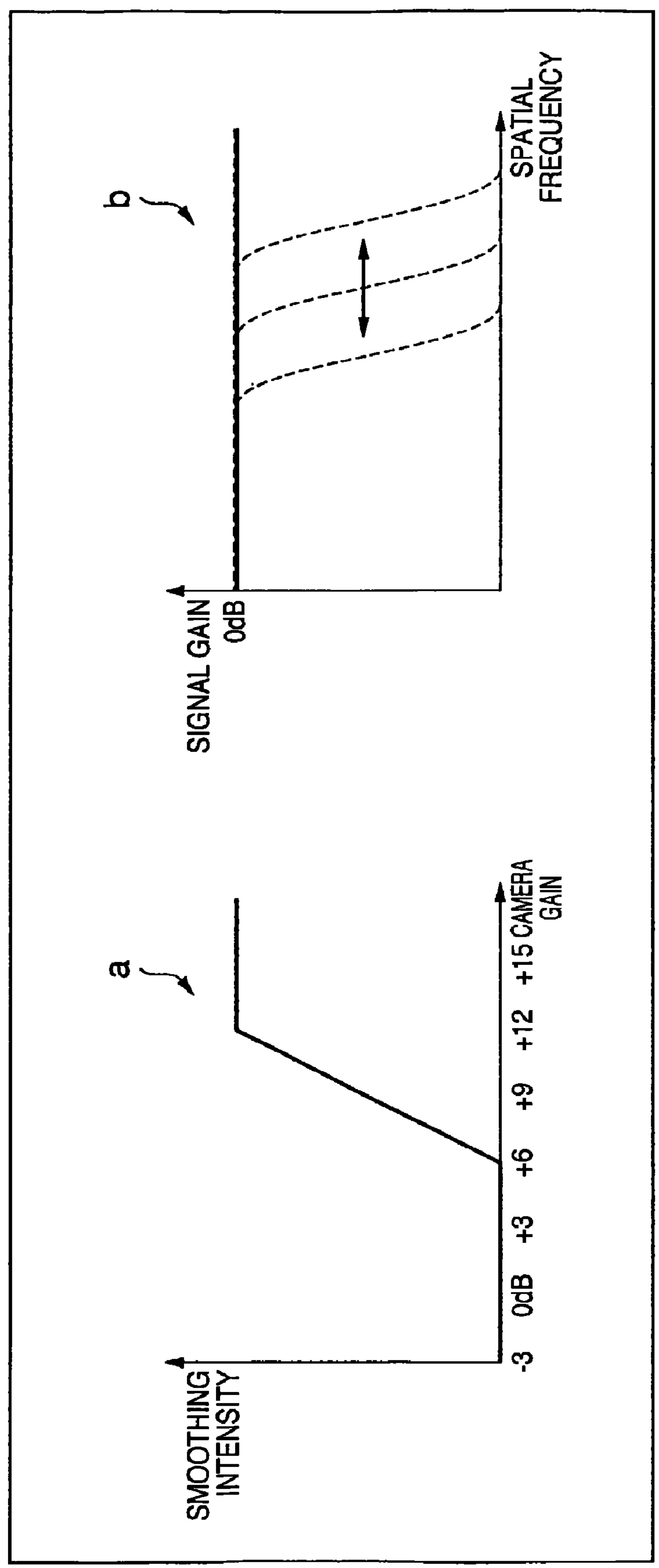
F I G. 5
SMOOTHING INTENSITY
-3
0dB
+3
+6
+9
+12
+15
CAMERA GAIN
a
SIGNAL GAIN
0dB
SPATIAL FREQUENCY
b

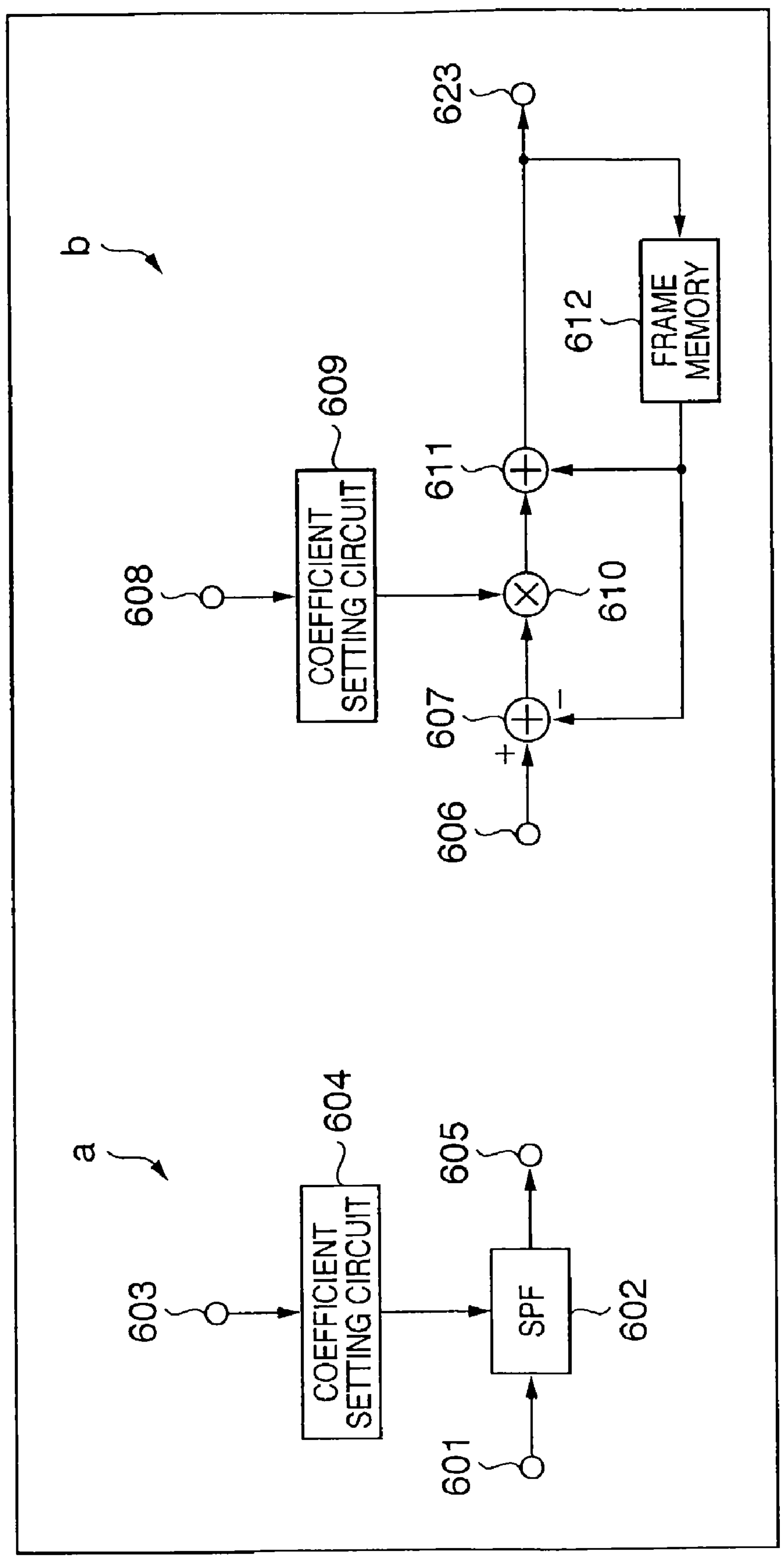
F I G. 6
a
601
602
SPF
603
COEFFICIENT SETTING CIRCUIT
604
605
b
606
607
608
COEFFICIENT SETTING CIRCUIT
609
610
611
612
FRAME MEMORY
623
+
− a
SMOOTHING INTENSITY
CAMERA GAIN
-3
0dB
+3
+6
+9
+12
+15
a
b
c
b
SIGNAL GAIN
0dB
SPATIAL FREQUENCY

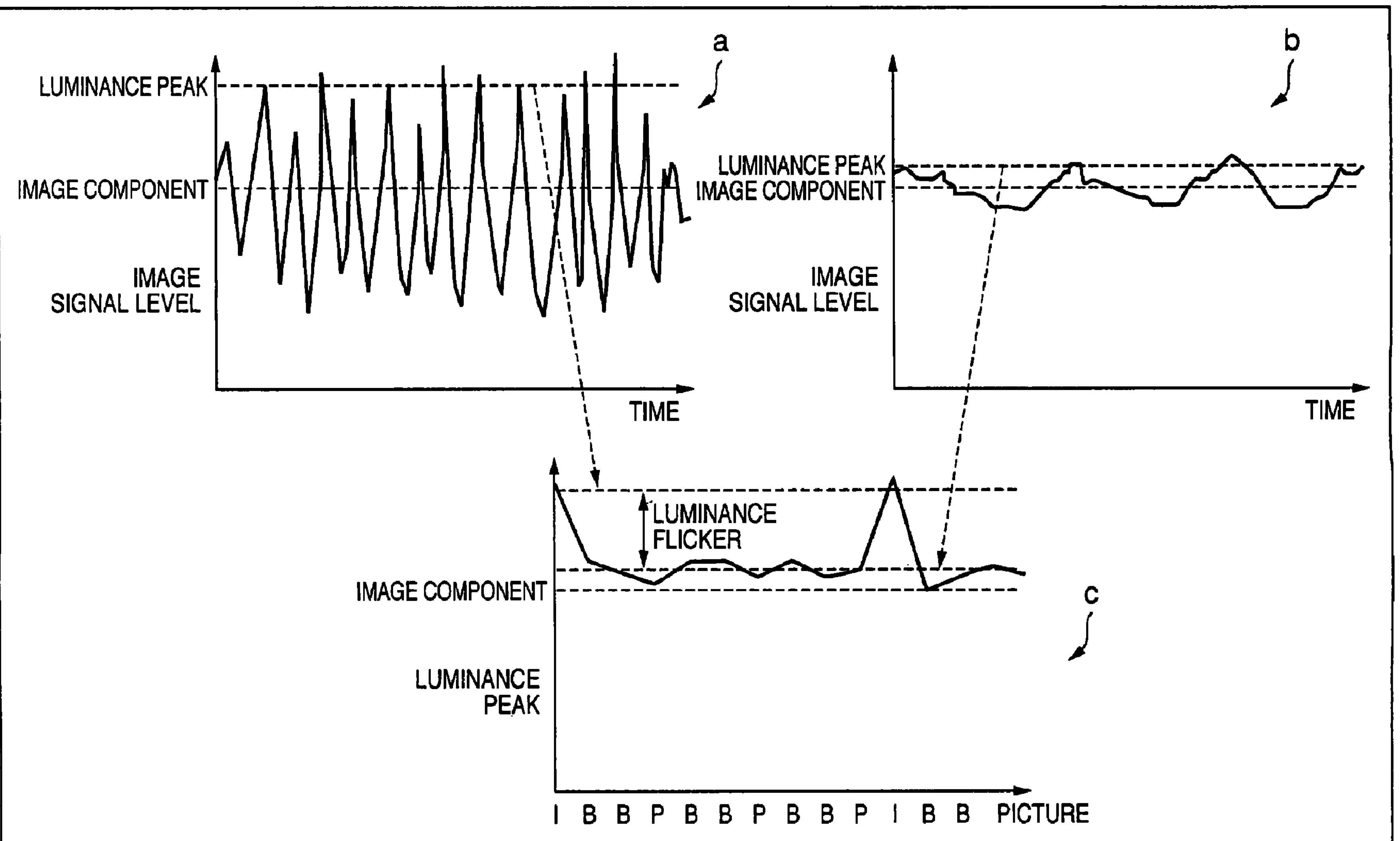
F I G. 16
a
LUMINANCE PEAK
IMAGE COMPONENT
IMAGE SIGNAL LEVEL
TIME
b
LUMINANCE PEAK
IMAGE COMPONENT
IMAGE SIGNAL LEVEL
TIME
c
LUMINANCE FLICKER
IMAGE COMPONENT
LUMINANCE PEAK
I B B P B B P B B P I B B
PICTURE

IMAGE SIGNAL PROCESSING APPARATUS WITH CODE AMOUNT CONTROL FOR INTER-FRAME AND INTRA-FRAME ENCODING

TECHNICAL FIELD

The present invention relates to an image signal processing apparatus for processing a photographed image signal and, more particularly, to suppression processing of a flicker that occurs upon increasing the camera gain in a compression scheme using intra-picture and inter-picture prediction.

BACKGROUND ART

Recently, recorders capable of recording moving image data in a hard disc or a DVD (Digital Versatile Disc) are coming along and replacing conventional VCRs for recording TV programs. These recorders can record enormous amounts of moving image data on a single disc by compressing the data using efficient encodings such as MPEG (Moving Picture Experts Group) 2.

Efficient moving image encoding as represented by MPEG2 generally executes compression encoding by using a plurality of different picture types including intra-frame and inter-frame prediction. More specifically, only frames at a predetermined interval use a picture type for intra-frame encoding. Frames between them use a picture type for inter-frame prediction due to the fact that successive frames have high image data correlation, thereby increasing the moving image data compression efficiency.

FIG. 17 is a block diagram showing a conventional image signal processing apparatus. Reference numeral 1702 denotes a camera unit; and 1701, a camera including a optical lens system and a photo-electric conversion unit such as a CCD (Charge Coupled Device). An analog moving image signal photographed by the camera 1701 undergoes processing such as A/D-conversion, pixel interpolation, color conversion, and γ-conversion by a photographed image signal processing circuit 1703. A camera control circuit 1725 executes processing such as exposure control of the camera 1701 on the basis of, for example, the brightness of the photographed image. If a dark image will be photographed at a the shutter speed less than a predetermined value in the moving image photographing mode of the camera unit 1702, the camera control circuit 1725 raises the amplifier gain of the photographed image signal processing circuit 1703 in order to not reduce the shutter speed, thereby preventing any after-image.

The photographed image signal processing circuit 1703 supplies its output to a frame rearranging circuit 1709 as image data to be encoded. The frame rearranging circuit 1709 rearranges frames in encoding order. As an example of this, in an MPEG2 encoding, the frames are rearranged in an order suitable for encoding. For example, a B-picture serving as a bidirectional prediction frame should be encoded after the encoding of the preceding and succeeding frames and therefore it is moved backward.

For I-pictures, a difference circuit 1710 outputs the image data itself to a DCT circuit 1711. For P- and B-pictures, the difference circuit 1710 calculates the difference value between the image data and a predicted image and outputs the difference value to the DCT circuit 1711 according to a selection by a switch 1723. The DCT circuit 1711 converts the image data into a DCT coefficient. A quantization circuit 1712 quantizes the DCT coefficient using a predetermined quantization scale Q. When the Q value changes, the coefficient value after quantization changes greatly. Hence, the generated code amount changes.

A variable-length coding circuit 1713, for example, entropy-encodes the quantization coefficient output from the quantization circuit 1712 and outputs it as encoded data. A buffer 1714 temporarily saves the generated encoded data to control the encoding rate. The encoded data stored in the buffer 1714 is read out at a predetermined rate and output from a terminal 1715 as compression-encoded data.

Meanwhile, the coefficient data quantized by the quantization circuit 1712 undergoes inverse quantization by an inverse quantization circuit 1717 and inverse DCT by an inverse DCT circuit 1718 to obtain predicted image data. For I-pictures, an adding circuit 1719 saves data after inverse DCT directly in a video memory 1720. For P- and B-pictures, the adding circuit 1719 adds the predicted image to the P- and B-pictures and saves it in the video memory 1720 as locally decoded image data. A motion compensation predicting circuit 1721 compares the locally decoded image data saved in the video memory 1720 with the input image data. For P-pictures, predicted image data with motion compensation in the forward direction is generated and supplied to the above-described difference circuit 1710. For B-pictures, predicted image data with bidirectional motion compensation is generated and supplied to the above-described difference circuit 1710. The motion compensation predicting circuit 1721 also supplies the generated image data to the adding circuit 1719 as a predicted image for next local decoding.

A rate control circuit 1727 executes code amount assignment control of a picture to be encoded for a target encoding rate using information such as a past generated code amount and buffer fill factor obtained from the buffer 1714. At this time, the rate control circuit 1727 controls the quantization circuit 1712 by deciding the quantization scale Q based on a code amount assigned to each picture type. The generated code amount after quantization changes between the I-, P-, and B-pictures. The quantization scale Q is therefore generally changed in accordance with the picture type. For example, an encoding scheme known as MPEG2-TM (Test Model) sets the quantization scale corresponding to each picture type.

Conventional video cameras execute exposure control of the camera 1701 in accordance with the brightness of a photographed image, as in the above-described camera unit 1702. In a normal brightness range, the video camera generally maintains adequate exposure mainly by combining the F-number and shutter speed. However, a video camera may increase the gain in a dark scene with a full aperture. Generally, an image photographed at the increased gain has a low S/N ratio because of a random noise component mixed into the image. In this case, if an encoding such as the above-described MPEG2 using a plurality of different picture types is used, the luminance peak generated by the noise component after encoding varies depending on the picture type. The variation is observed as a luminance flicker in the reproduced moving image, resulting in a visual disturbance, as is known.

Under these circumstances, a patent proposal has been made to remove random noise generated when increasing the gain by improving the characteristic of a filter circuit synchronized with increases in the gain (for example, WO97/05745).

FIG. 16 shows graphs a through c for explaining the cause of a luminance flicker in the reproduction mode which is generated when increasing the gain of the camera used in the conventional arrangement described above. The graph a of FIG. 16 shows a reproduction signal from I-pictures. The luminance peak of the noise component superimposed on a flat image signal is maintained to some extent by intra-frame encoding. This is also because the assigned code amount of I-pictures is generally larger than that of the other picture types.

The graph b of FIG. 16 shows a reproduction signal from P- and B-pictures. In an image photographed at an increased gain, the correlation between frames is low because of the random noise component. In normal encoding, therefore, the encoded image signal degrades because of the increase in inter-frame difference information of P- and B-pictures. The noise peak decreases so that a luminance peak difference is generated, unlike the I-pictures in the graph a of FIG. 16. Hence, a luminance flicker derived from noise is generated in reproducing a moving image, as shown in the graph c of FIG. 16.

The conventional technique to remove random noise derived when increasing the gain, i.e., the method of changing the filter characteristic as in WO97/05745 is one of general encoding distortion reducing methods in the case of a low S/N ratio and can expect a partial effect. However, in order to completely remove the above-described luminance flicker using a filter alone, the filter intensity must be sufficiently high. However this considerably degrades the resolution and causes serious, adverse effects such as an afterimage in the original image. A TV program image can sometimes contain intentionally added noise intended to produce a film-like effect based on the granularity of noise. In this situation, it is impossible to uniformly remove noise using a filter. Removal of the noise component itself must be suppressed as much as possible. That is, to effectively reduce the above-described luminance flicker while maintaining image quality, the invention of WO97/05745 does not suffice.

DISCLOSURE OF INVENTION

The present invention has been made to solve the above-described unsolved problems of the prior art, and has as its object to effectively reduce a luminance flicker caused by noise while suppressing adverse effects such as afterimages and decreases in resolution due to smoothing as much as possible even when the S/N ratio of an image photographed at an increased gain is low. It has, as another object, the reduction of a luminance flicker while making the most of the effect of noise even when photographing an image containing noise that is intentionally added to obtain an effect in the image.

One aspect of the present invention according to one of embodiments relates to an image signal processing apparatus for classifying pictures contained in an image signal into a plurality of picture types and compression-encoding the image signal, characterized by comprising, acquisition unit adapted to acquire a gain setting value for the image signal;

compression encoding adapted to execute compression-encoding the image signal, adjustment unit capable of adjusting a code amount to be assigned to each picture type in the compression encoding unit; and control adapted to control to change, in accordance with the gain setting value acquired by the acquisition unit, an assignment ratio of code amount for each picture type which is adjusted by the adjustment unit.

Another aspect of the present invention according to one of embodiments relates to an image signal processing apparatus for classifying pictures contained in an image signal into a plurality of picture types and compression-encoding the image signal, comprising, acquisition unit adapted to acquire a gain setting value for the image signal, smoothing unit adapted to execute smoothing processing of the image signal, compression encoding unit, provided on a subsequent stage of the smoothing unit, adapted to execute compression-encoding the image signal, adjustment unit capable of adjusting a code amount to be assigned to each picture type in the compression encoding unit, and control unit adapted to control to change, in accordance with the gain setting value acquired by the acquisition unit, an intensity of smoothing processing by the smoothing unit and an assignment ratio of code amount for each picture type which is adjusted by the adjustment unit.

Further aspect of the present invention according to one of embodiments relates an image signal processing apparatus for classifying pictures contained in an image signal into a plurality of picture types and compression-encoding the image signal, comprising, acquisition adapted to acquire a gain setting value of gain adjustment for the image signal and a sharpness setting value of sharpness adjustment, smoothing unit adapted to execute smoothing processing of the image signal, compression encoding unit, provided on a subsequent stage of the smoothing unit, adapted to execute compression-encoding the image signal, adjustment unit capable of adjusting a code amount to be assigned to each picture type in the compression encoding unit, and control unit adapted to control to change, in accordance with the gain setting value and the sharpness setting value acquired by the acquisition unit, an intensity of smoothing processing by the smoothing unit and an assignment ratio of code amount for each picture type which is adjusted by the adjustment unit.

Further aspect of the present invention according to one of embodiments relates to an image signal processing apparatus for classifying pictures contained in an image signal into a plurality of picture types and compression-encoding the image signal, comprising, acquisition unit adapted to acquire a gain setting value for the image signal, smoothing unit adapted to execute smoothing processing of the image signal, compression encoding unit, provided on a subsequent stage of the smoothing unit, adapted to execute compression-encoding the image signal, adjustment unit capable of adjusting a code amount to be assigned to each picture type in the compression encoding unit, and designation unit adapted to designate a target bit rate of compression encoding of the compression encoding unit, and control unit adapted to control to change, in accordance with the gain setting value acquired by the acquisition unit and the target bit rate designated by the designation unit, an intensity of smoothing processing by the smoothing unit and an assignment ratio of code amount for each picture type which is adjusted by the adjustment unit.

Further aspect of the present invention according to one of embodiments relates to a control method of an image signal processing apparatus for classifying pictures contained in an image signal into a plurality of picture types and compression-encoding the image signal, comprising steps of, acquiring a gain setting value for the image signal, setting an assignment ratio of code amount for each picture type, compression-encoding the image signal in accordance with the set ratio, changing, in accordance with the acquired gain setting value, an assignment ratio of code amount for each picture type.

Further features of the present invention will become apparent from the following description of exemplary embodiments (with reference to the attached drawings).

BRIEF DESCRIPTION OF DRAWINGS

FIG. 1 is a block diagram of a digital video camera according to the first embodiment;

FIG. 5 shows graphs showing another example of smoothing intensity control according to the first embodiment;

FIG. 6 shows block diagrams showing structural examples of a smoothing circuit;

FIG. 16 shows graphs for explaining a cause of a luminance flicker; and

BEST MODE FOR CARRYING OUT THE INVENTION

Figure 2:
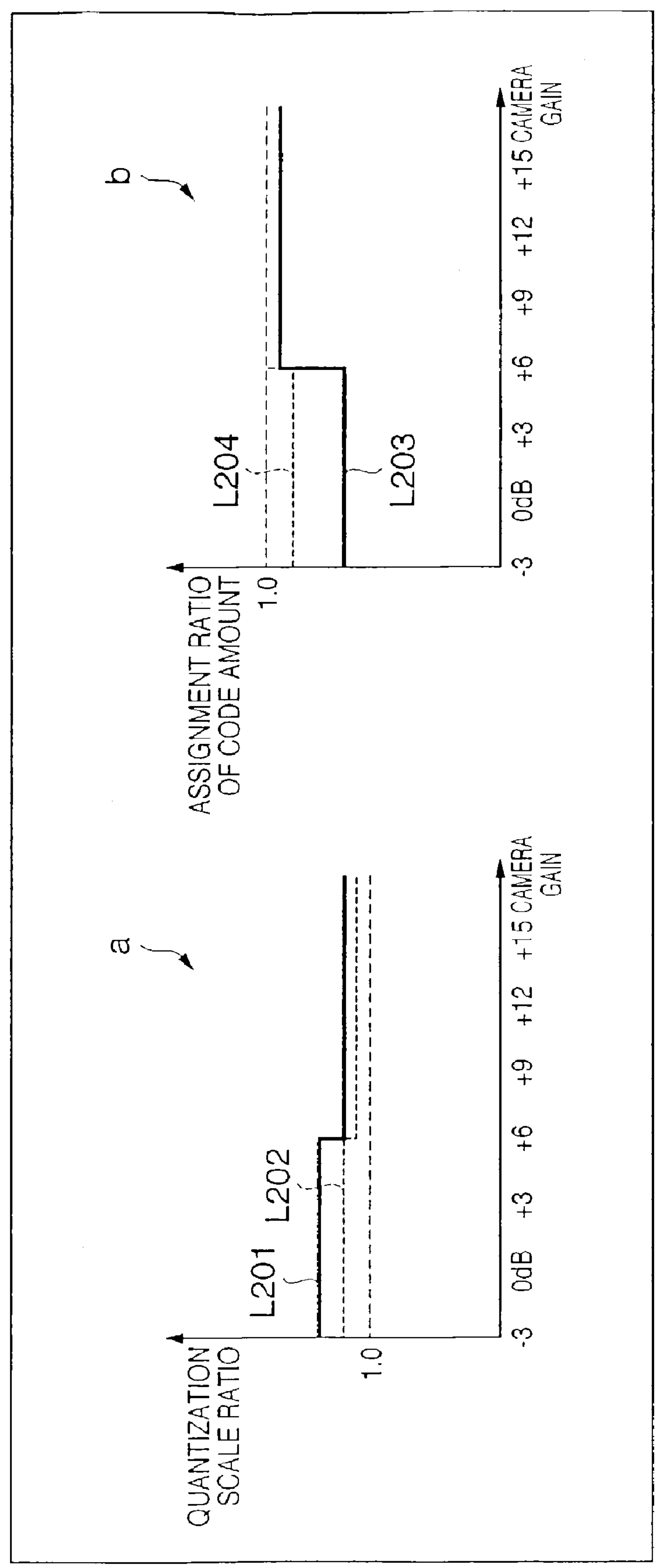
FIG. 2 shows graphs showing an example of assigned code amount control according to the first embodiment.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided show that this disclosure will be thorough and complete, and will fully convey the scope of the invention to those skilled in the art. Like numbers refer to like elements throughout.

The embodiments of the present invention will be described below in detail with reference to the accompanying drawings.

An embodiment of an image signal processing apparatus of the present invention will be described by exemplifying a digital video camera capable of encoding an image signal photographed with a camera by a compression scheme using intra-picture prediction and inter-picture prediction and outputting the encoded data. Pictures include a field image and a frame image. In the following description, a picture indicates a frame image.

[First Embodiment]

FIG. 1 is a block diagram showing, as the first embodiment, a digital video camera according to an embodiment of an image signal processing apparatus of the present invention. Reference numeral 102 denotes a camera unit; and 101, a camera including a lens optical system and a photo-electric conversion unit such as a CCD. An analog moving image signal photographed by the camera 101 undergoes processing such as A/D-conversion, pixel interpolation, color conversion, and γ-conversion by a photographed image signal processing circuit 103.

A camera control circuit 125 executes processing such as exposure control of the camera 101 on the basis of, for example, the brightness of the photographed image. If a dark image will be photographed at a the shutter speed less than a predetermined value in the moving image photographing mode of the camera unit 102, as described above, the camera control circuit 125 controls to raise the amplifier gain of the photographed image signal processing circuit 103 not to reduce the shutter speed, thereby preventing any afterimage. A camera apparatus for business use generally has a function of causing a user to arbitrarily switch the camera gain. When the camera unit 102 has this function, the camera control circuit 125 controls to make the photographed image signal processing circuit 103 have a fixed amplifier gain corresponding to a user setting value input from an operation unit (not shown).

The photographed image signal processing circuit 103 supplies its output to a smoothing circuit 124 as an image signal from the camera unit 102. The smoothing circuit 124 includes a variable-band special filter that limits the spatial band of an image signal, a variable temporal filter that executes temporal smoothing of each pixel, or a combination thereof. The smoothing circuit 124 will be described later in detail.

The output from the smoothing circuit 124 is supplied to a frame rearranging circuit 109 as image data to be encoded. The frame rearranging circuit 109 rearranges frames in an encoding order. In, for example, MPEG2 encoding, the frames are rearranged in an order suitable for encoding. For example, a B-picture serving as a bidirectional prediction frame should be encoded after encoding of the preceding and succeeding frames and therefore is moved backward.

For I-pictures, a difference circuit 110 outputs the image data itself to a DCT circuit 111. For P- and B-pictures, the difference circuit 110 calculates the difference value between the image data and a predicted image and outputs the difference value to the DCT circuit 111 by selecting a switch 123. The DCT circuit 111 converts the image data into a DCT coefficient. A quantization circuit 112 quantizes the DCT coefficient by using a predetermined quantization scale Q. When the Q value changes, the coefficient value after quantization largely changes. Hence, the generated code amount changes.

A variable-length coding circuit 113, for example, entropy-encodes the quantization coefficient output from the quantization circuit 112 and outputs it as encoded data. A buffer 114 temporarily saves the generated encoded data to control the encoding rate. The encoded data stored in the buffer 114 is read out at a predetermined rate and output from a terminal 115 as compression-encoded data. It is possible to efficiently record the output compression-encoded data on a recording medium such as a tape, disc, or semiconductor memory or efficiently transmit the compression-encoded data by using a network or commutation channel.

On the other hand, the coefficient data quantized by the quantization circuit 112 undergoes inverse quantization by an inverse quantization circuit 117 and inverse DCT by an inverse DCT circuit 118 to obtain predicted image data. For I-pictures, an adding circuit 119 saves data after inverse DCT directly in a video memory 120. For P- and B-pictures, the adding circuit 119 adds the predicted image to the P- and B-pictures and saves it in the video memory 120 as locally decoded image data. A motion compensation predicting circuit 121 compares the locally decoded image data saved in the video memory 120 with the input image data. For P-pictures, predicted image data with motion compensation in the forward direction is generated and supplied to the above-described difference circuit 110. For B-pictures, predicted image data with bidirectional motion compensation is generated and supplied to the above-described difference circuit 110. The motion compensation predicting circuit 121 also supplies the generated image data to the adding circuit 119 as a predicted image for next local decoding.

A rate control circuit 127 executes code amount assignment control of a picture to be encoded for a target encoding rate in accordance with information such as a past generated code amount and buffer fill factor obtained from the buffer 114 and the setting value of a code amount ratio setting circuit 126 (to be described later). At this time, the rate control circuit 127 controls the quantization circuit 112 by deciding the quantization scale Q based on a code amount assigned to each picture type. The generated code amount after quantization changes between the I-, P-, and B-pictures. The quantization scale Q is therefore changed in accordance with the picture type. For example, in calculating of code amount assignment, the ratio of the quantization scale Q of P- and B-pictures to the quantization scale Q of I-pictures is set, thereby setting the quantization scale Q corresponding to each picture type.

A flicker suppression control circuit 116 as a characteristic feature of this embodiment controls smoothing processing of the smoothing circuit 124 and the code amount ratio setting circuit 126 in accordance with a camera gain setting value supplied from the camera control circuit 125. The flicker suppression control circuit 116 controls the code amount ratio setting circuit 126 to change the code amount ratio to be assigned to each picture type, thereby suppressing a luminance flicker upon increasing the gain.

FIG. 2 shows graphs a and b showing control of assignment ratio of code amount by the camera gain. A graph a of FIG. 2 shows quantization scale ratio control for control of assignment ratio of code amount. As described above, the ratio of the quantization scale of P- and B-pictures to the quantization scale Q of I-pictures is set by code amount assignment control by the rate control circuit 127, thereby controlling the code amount ratio to be assigned to each picture type. L201 indicates a change in the quantization scale ratio of B-pictures according to the camera gain. When the camera gain exceeds +6 dB, the quantization scale ratio of B-pictures decreases. As a result, the generated code amount ratio of B-pictures increases. L202 indicates a change in the quantization scale ratio of P-pictures according to the camera gain. When the camera gain exceeds +6 dB, the quantization scale ratio of P-pictures decreases. As a result, the generated code amount ratio of P-pictures increases.

A graph b of FIG. 2 shows a state wherein the assigned code amount ratio changes upon quantization scale ratio control according to the camera gain in the graph a of FIG. 2. L203 indicates an assigned code amount ratio of B-pictures. When the camera gain exceeds +6 dB, the assigned code amount ratio increases in accordance with the change L201 in the quantization scale ratio in the graph a of FIG. 2. L204 indicates an assigned code amount ratio of P-pictures. When the camera gain exceeds +6 dB, the assigned code amount ratio increases in accordance with the change L202 in the quantization scale ratio in the graph a of FIG. 2. To make the whole code generation amount as equal as possible before and after the camera gain exceeds +6 dB, a smaller code amount may be assigned to I-pictures when the code amount to be assigned to the P- and B-pictures increases.

Figure 3:
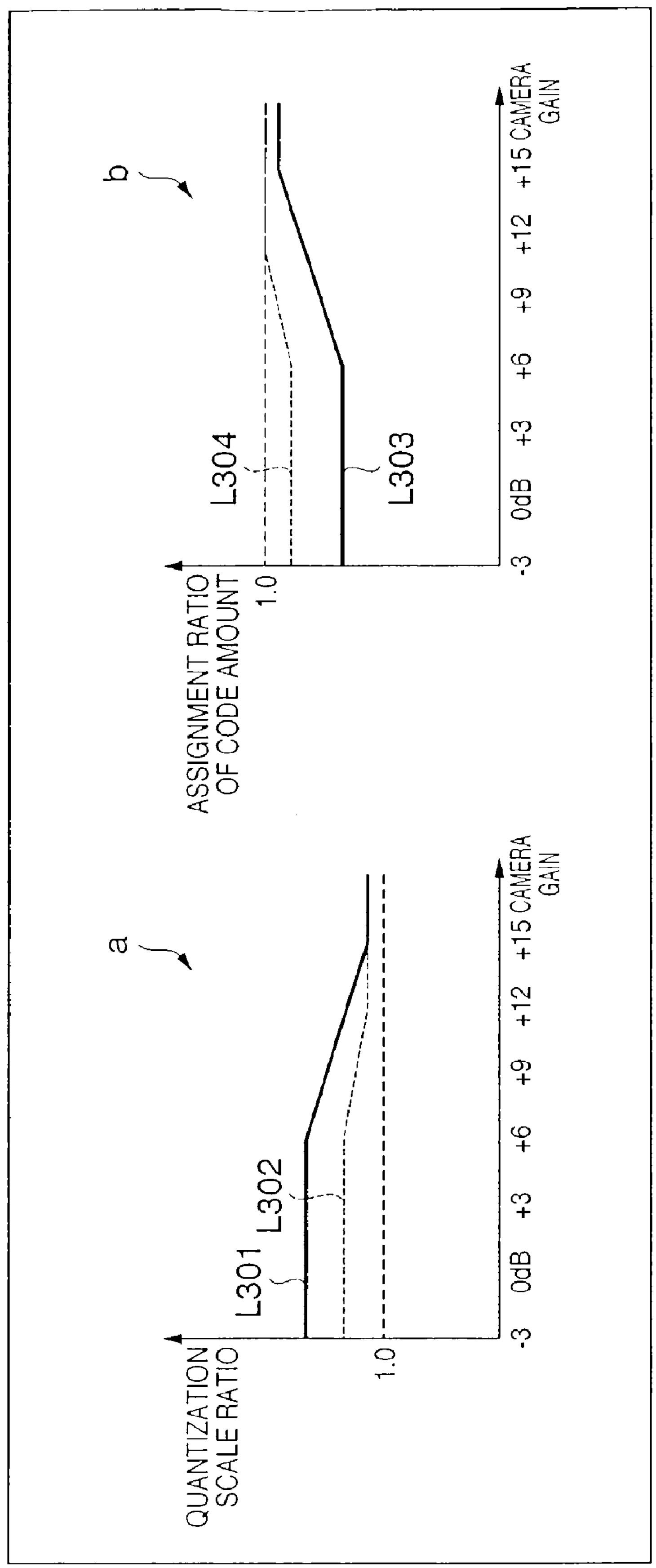
FIG. 3 shows graphs showing another example of assigned code amount control according to the first embodiment.

In the examples shown in FIG. 2, the camera gain has a predetermined threshold value so that the quantization scale ratio is controlled in two steps. It is also possible to change the quantization scale ratio in proportion to the camera gain. FIG. 3 shows examples of control of assignment ratio of code amount proportional to the camera gain. A graph a of FIG. 3 shows quantization scale ratio control for control of assignment ratio of code amount. L301 indicates a change in the quantization scale ratio of B-pictures according to the camera gain. When the camera gain exceeds +6 dB, the quantization scale ratio of B-pictures decreases in accordance with the camera gain. As a result, the generated code amount ratio of B-pictures increases. L302 indicates a change in the quantization scale ratio of P-pictures according to the camera gain. When the camera gain exceeds +6 dB, the quantization scale ratio of P-pictures decreases in accordance with the camera gain. As a result, the generated code amount ratio of P-pictures increases.

A graph b of FIG. 3 shows a state wherein the assigned code amount ratio changes upon quantization scale ratio control according to the camera gain in the graph a of FIG. 3. L303 indicates an assigned code amount ratio of B-pictures. When the camera gain exceeds +6 dB, the assigned code amount ratio increases in accordance with the change L301 in the quantization scale ratio in the graph a of FIG. 3. L304 indicates an assigned code amount ratio of P-pictures. When the camera gain exceeds +6 dB, the assigned code amount ratio increases in accordance with the change L302 in the quantization scale ratio in the graph a of FIG. 3.

As described above, in this embodiment, the assigned code amount ratio of P- and B-pictures increases as the camera gain increases. This allows to suppress loss of the peak of the noise component upon increasing the gain when P- and B-pictures are encoded. This arrangement can reduce a luminance flicker in reproducing encoded image data.

In this embodiment, the flicker suppression control circuit 116 controls spatial or temporal smoothing or spatial and temporal smoothing of the above-described smoothing circuit 124. When the arrangement to control the smoothing processing combines with the above-described arrangement to control code amount assignment, a synergy effect can be expected.

In a detailed arrangement of smoothing control, the smoothing circuit 124 executes smoothing at an intensity corresponding to the camera gain to suppress the peak of the noise component itself and decrease the luminance peak due to the noise component of I-pictures. This allows to reduce the difference from the decrease in the luminance peak of noise upon encoding P- and B-pictures. As a result, a luminance flicker between the pictures can be suppressed. Additionally, this smoothing processing also suppresses the noise component input to the P- and B-pictures. This further suppresses the decrease in the luminance peak of noise dependent on encoding by an increase in the code amount assignment ratio.

A circuit a of FIG. 6 shows a detailed example of the smoothing circuit 124, which implements a smoothing circuit by a variable-band spatial filter that limits the spatial band. A one- or two-dimensional spatial filter (SPF) circuit 602 spatially smoothes an image signal supplied to a terminal 601. The smoothing intensity of a spatial filter indicates the passband characteristic of the spatial filter. The variable-band spatial filter shown in the circuit a of FIG. 6 causes a coefficient setting circuit 604 to set the weighting coefficient of the filter to a reference pixel to obtain a predetermined passband characteristic, thereby changing the passband characteristic, i.e., the smoothing intensity. A terminal 603 is a smoothing intensity control input terminal. A terminal 605 outputs the image signal that has undergone the smoothing processing.

Figure 4:
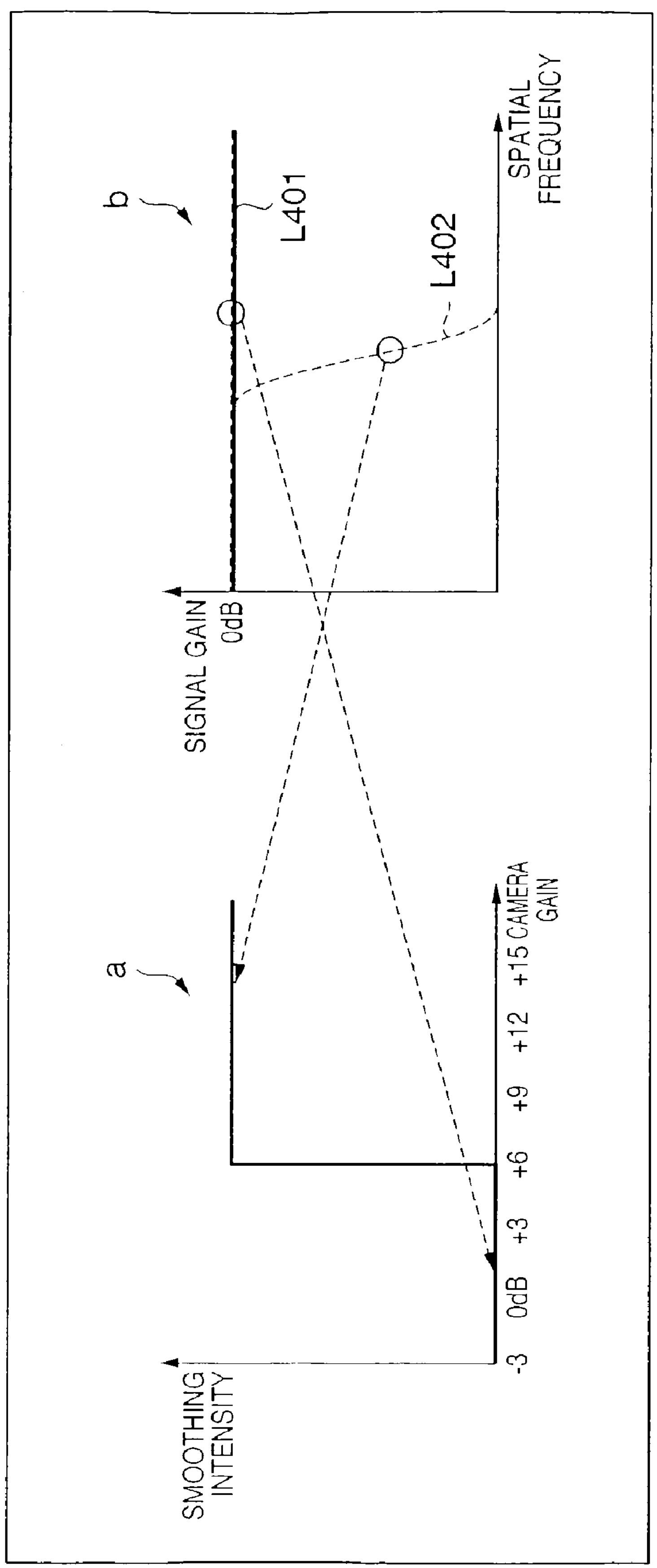
FIG. 4 shows graphs showing an example of smoothing intensity control according to the first embodiment.

A graph a of FIG. 4 shows an example of smoothing intensity control according to the camera gain. When the camera gain exceeds +6 dB, smoothing processing is executed. A graph b of FIG. 4 shows the band characteristic of the spatial filter corresponding to the change in the smoothing intensity in the graph a of FIG. 4. L401 indicates a band characteristic obtained when no smoothing processing is executed. This characteristic corresponds to the region less than +6 dB in the graph a of FIG. 4. L402 indicates a band characteristic obtained when smoothing processing is executed. This characteristic corresponds to the region equal to or more than +6 dB in the graph a of FIG. 4. In spatial smoothing processing, smoothing is executed by limiting the high frequency side of the passband. The band narrows, and the smoothing intensity increases.

In the examples shown in FIG. 4, the camera gain has a predetermined threshold value so that the smoothing characteristic is changed in two steps (whole band is passed in one mode). It is also possible to change the smoothing intensity in proportion to the camera gain. A graph a of FIG. 5 shows an example of smoothing intensity control proportional to the camera gain. When the camera gain exceeds +6 dB, the smoothing intensity increases up to a predetermined upper limit in accordance with the camera gain. A graph b of FIG. 5 shows the band characteristic of the spatial filter corresponding to the change in the smoothing intensity in the graph a of FIG. 5. When the camera gain is +6 dB to +12 dB, the passband of the spatial filter narrows stepwise in accordance with the camera gain.

A variable temporal filter that executes temporal smoothing of each pixel is independently applicable to the smoothing processing of this embodiment. It is possible to use the above-described spatial filter together.

A circuit b of FIG. 6 shows a detailed example of the smoothing circuit 124, which implements a smoothing circuit by a variable temporal filter that executes temporal smoothing of each pixel. This circuit is known as a recursive filter. A subtracting circuit 607 calculates the difference between each pixel of an image signal supplied to a terminal 606 and a corresponding pixel of the preceding frame. A coefficient multiplying circuit 610 multiplies the difference value by a predetermined coefficient. An adding circuit 611 adds the result to the pixel of the preceding frame. If the coefficient is 1, an output terminal 623 outputs the same value as the input, and the smoothing intensity is 0. If the coefficient is smaller than 1, smoothing by an IIR filter is executed between the current frame and the preceding frame. The smoothing intensity changes depending on the coefficient. A terminal 608 is a smoothing intensity control input terminal. A coefficient setting circuit 609 sets a coefficient corresponding to the input smoothing intensity. A frame memory 612 holds the processed image signal to be used to process the succeeding frame.

Figure 15:
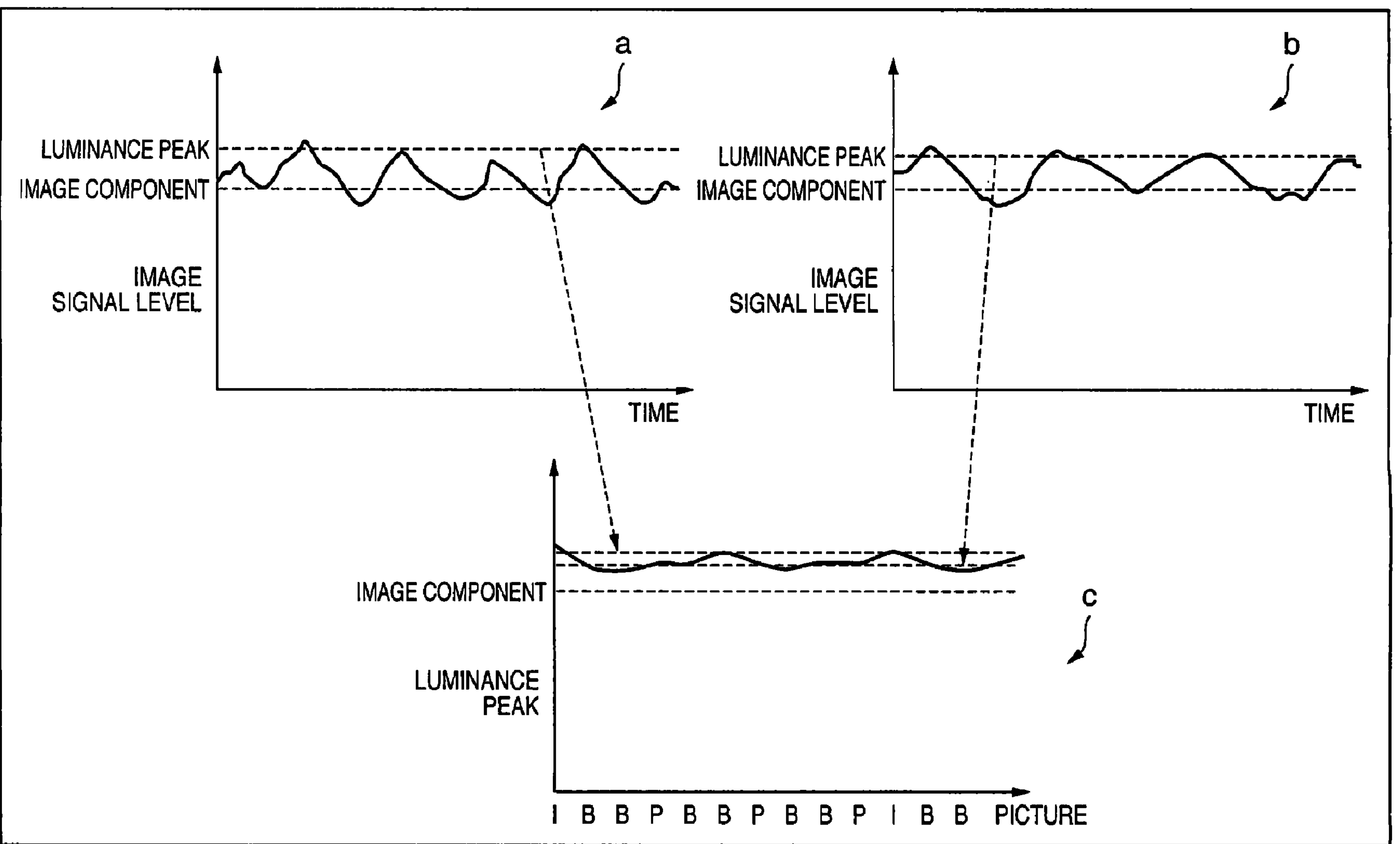
FIG. 15 shows graphs for explaining a luminance flicker reduction effect according to the present invention.
Figure 17:
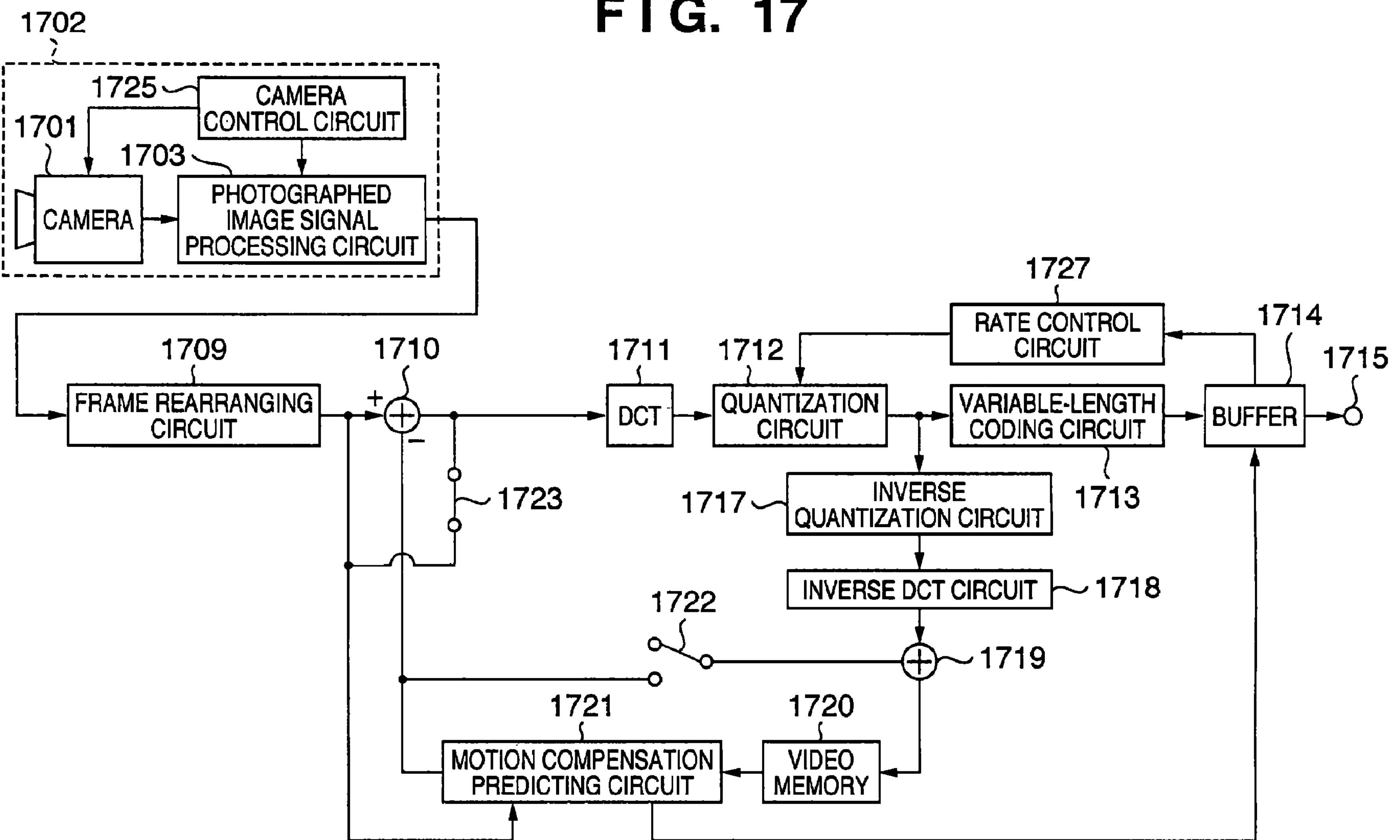
FIG. 17 is a block diagram showing the arrangement of a conventional image signal processing apparatus.

FIG. 15 shows graphs a through c showing the luminance flicker reduction effect upon increasing the camera gain when encoded data generated in this embodiment is reproduced. The graph a of FIG. 15 shows the reproduction signal from I-pictures. The smoothing circuit suppresses the luminance peak of the noise component superimposed on a flat image signal so that the peak is lower than in the graph a of FIG. 16. It is also possible to suppress the luminance peak of the noise component in I-pictures by assigning a smaller code amount to I-pictures when a larger code amount is assigned to the P- and B-pictures. The graph b of FIG. 15 shows the reproduction signal from P- and B-pictures. Smoothing suppresses the noise peak. In addition, since the assigned code amount ratio increases, the luminance peak of noise is reproduced without excessively decreasing upon encoding. Hence, the luminance peak difference between the graphs a and b of FIG. 15 decreases. Even in reproducing a moving image, the luminance peak flicker caused by noise decreases, as is apparent from the graph c of FIG. 15.

As described above, in this embodiment, the assigned code amount ratio of each picture type and the image signal smoothing intensity are controlled collectively in accordance with the camera gain. This allows to effectively reduce the noise flicker while minimizing an adverse effect such as a decrease in the resolution or an afterimage due to smoothing. Even when a camera apparatus for business use is used for photographing containing noise as a photographic effect, the flicker can be reduced while making the most of the effect of noise.

[Second Embodiment]

Figure 7:
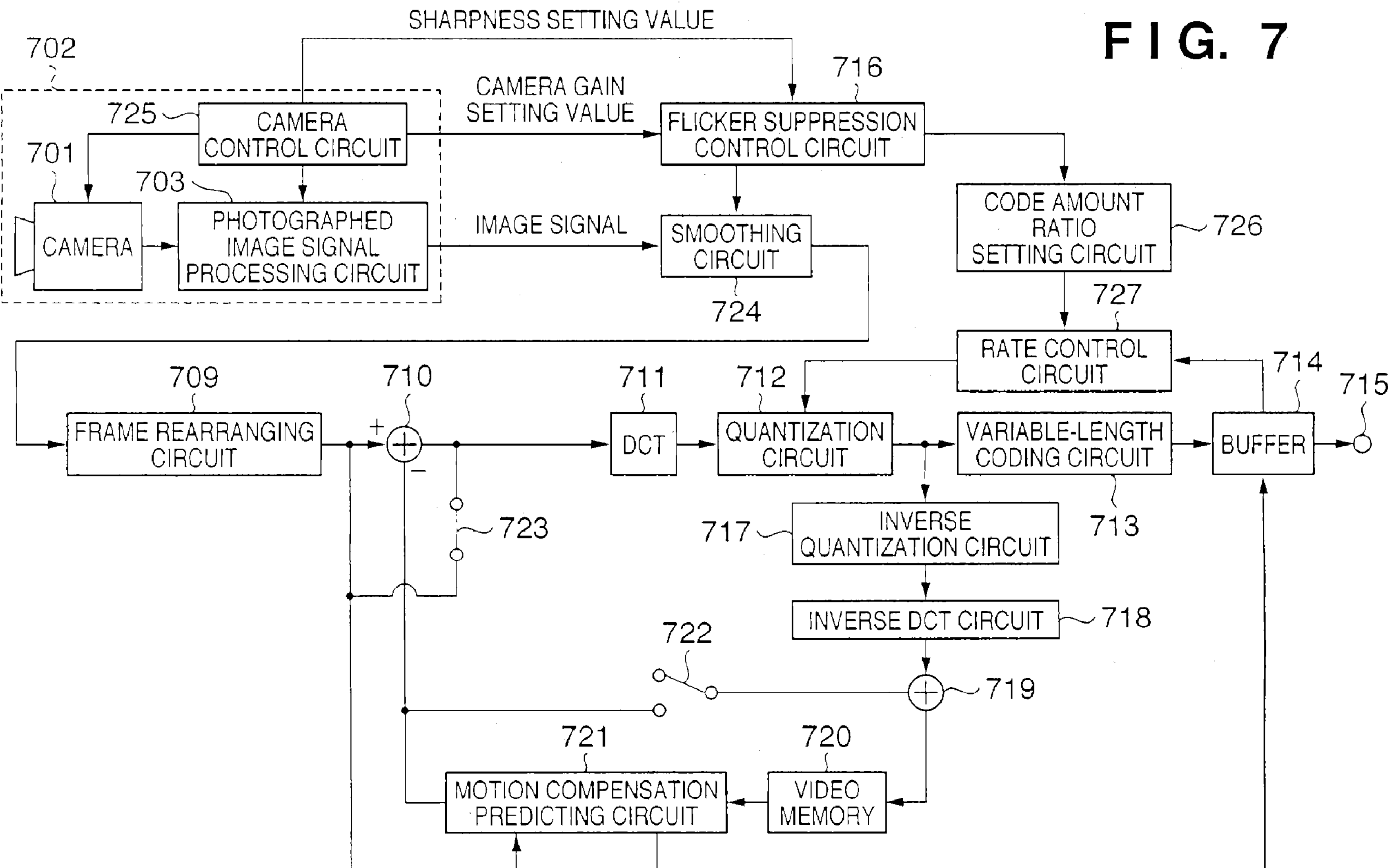
FIG. 7 is a block diagram of a digital video camera according to the second embodiment.

FIG. 7 is a block diagram showing, as the second embodiment, a digital video camera according to another embodiment of an image signal processing apparatus of the present invention. Reference numeral 702 denotes a camera unit; and 701, a camera including a lens optical system and a photoelectric conversion unit such as a CCD. An analog moving image signal photographed by the camera 701 undergoes processing such as A/D-conversion, pixel interpolation, color conversion, and γ-conversion by a photographed image signal processing circuit 703. The photographed image signal processing circuit 703 also executes sharpness control processing of controlling the resolution by adding, to the original image signal, an aperture correction signal generated from the high frequency component of the image signal.

A camera control circuit 725 executes processing such as exposure control of the camera 701 on the basis of, for example, the brightness of the photographed image. The camera control circuit 725 controls the amplifier gain of the photographed image signal processing circuit 703 as needed, as in the first embodiment. The camera control circuit 725 also controls the sharpness control processing of the photographed image signal processing circuit 703 to adjust the resolution of the image signal. The sharpness can be either set within a predetermined range by the user or automatically controlled by the camera control circuit 725 in accordance with the photographing situation.

The photographed image signal processing circuit 703 supplies its output to a smoothing circuit 724 as an image signal from the camera unit 702. The smoothing circuit 724 includes a variable-band special filter that limits the spatial band of an image signal, a variable temporal filter that executes temporal smoothing of each pixel, or a combination thereof. The smoothing circuit 724 has already been described in detail in the first embodiment, and a repetitive description will be omitted here.

The output from the smoothing circuit 724 is supplied to a frame rearranging circuit 709 as image data to be encoded. The frame rearranging circuit 709 rearranges frames in an encoding order.

For I-pictures, a difference circuit 710 outputs the image data itself to a DCT circuit 711. For P- and B-pictures, the difference circuit 710 calculates the difference value between the image data and a predicted image and outputs the difference value to the DCT circuit 711 by selecting a switch 723. The DCT circuit 711 converts the image data into a DCT coefficient. A quantization circuit 712 quantizes the DCT coefficient by using a predetermined quantization scale Q.

A variable-length coding circuit 713, for example, entropy-encodes the quantization coefficient output from the quantization circuit 712 and outputs it as encoded data. A buffer 714 temporarily saves the generated encoded data to control the encoding rate. The encoded data stored in the buffer 714 is read out at a predetermined rate and output from a terminal 715 as compression-encoded data. It is possible to efficiently record the output compression-encoded data on a recording medium such as a tape, disc, or semiconductor memory or efficiently transmit the compression-encoded data by using a network or commutation channel.

On the other hand, the coefficient data quantized by the quantization circuit 712 undergoes inverse quantization by an inverse quantization circuit 717 and inverse DCT by an inverse DCT circuit 718 to obtain predicted image data. For I-pictures, an adding circuit 719 saves data after inverse DCT directly in a video memory 720. For P- and B-pictures, the adding circuit 719 adds the predicted image to the P- and B-pictures and saves it in the video memory 720 as locally decoded image data. A motion compensation predicting circuit 721 compares the locally decoded image data saved in the video memory 720 with the input image data. For P-pictures, predicted image data with motion compensation in the forward direction is generated and supplied to the above-described difference circuit 710. For B-pictures, predicted image data with bidirectional motion compensation is generated and supplied to the above-described difference circuit 710. The motion compensation predicting circuit 721 also supplies the generated image data to the adding circuit 719 as a predicted image for next local decoding.

A rate control circuit 727 executes code amount assignment control of a picture to be encoded for a target encoding rate in accordance with information such as a past generated code amount and buffer fill factor obtained from the buffer 714 and the setting value of a code amount ratio setting circuit 726 (to be described later). At this time, the rate control circuit 727 controls the quantization circuit 712 by deciding the quantization scale Q based on a code amount assigned to each picture type. The generated code amount after quantization changes between the I-, P-, and B-pictures. The quantization scale Q is therefore changed in accordance with the picture type.

A flicker suppression control circuit 716 as a characteristic feature of this embodiment controls smoothing processing of the smoothing circuit 724 and the code amount ratio setting circuit 726 in accordance with a camera gain setting value and sharpness setting value supplied from the camera control circuit 725. The flicker suppression control circuit 716 controls the code amount ratio setting circuit 726 to change the code amount ratio to be assigned to each picture type, thereby suppressing a luminance flicker upon increasing the gain.

Figure 8:
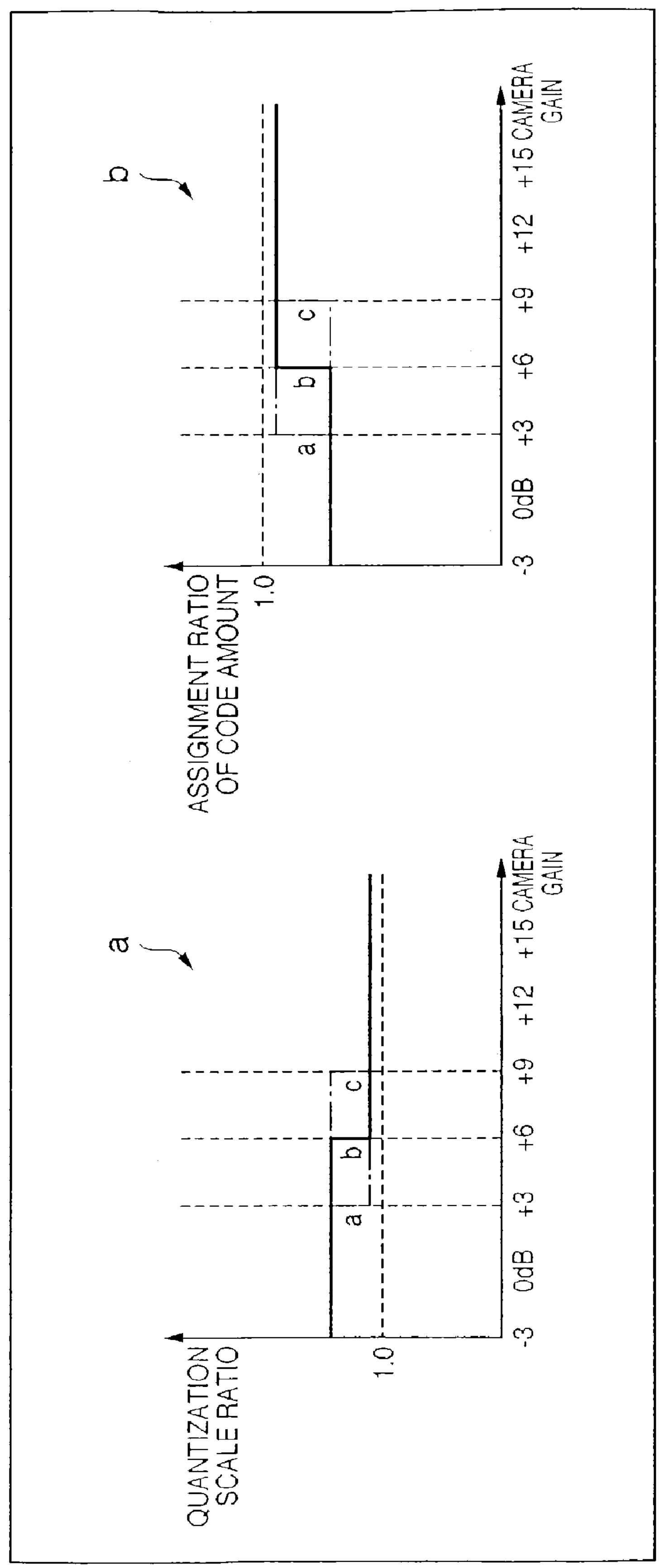
FIG. 8 shows graphs showing an example of assigned code amount control according to the second embodiment.

FIG. 8 shows graphs a and b showing control of assignment ratio of code amount by the camera gain and sharpness setting. The graph a of FIG. 8 shows quantization scale ratio control for control of assignment ratio of code amount. For the illustrative convenience, the graph a of FIG. 8 shows only the control characteristic of B-pictures. Symbols a, b, and c indicate changes in the quantization scale ratio of B-pictures according to the camera gain in correspondence with the sharpness setting intensities (high, medium, and low). The threshold value of the change in the quantization scale changes between a, b, and c. When the camera gain exceeds +3, +6, and +9 dB, the quantization scale ratio of B-pictures decreases. As a result, the generated code amount ratio of B-pictures increases. Generally, when the sharpness setting is high, the peak of the noise component is also enhanced as a high frequency component so that the luminance peak generated by noise increases. Hence, in this embodiment, the threshold value of quantization scale ratio change corresponding to the camera gain is changed in accordance with the sharpness intensity. If the sharpness is high, the quantization scale ratio decreases from a low camera gain.

The graph b of FIG. 8 shows a state wherein the assigned code amount ratio changes upon quantization scale ratio control according to the camera gain and sharpness setting in the graph a of FIG. 8. As in the graph a of FIG. 8, a, b, and c indicate changes in the assigned code amount ratio of B-pictures according to the camera gain in correspondence with the sharpness setting intensities (high, medium, and low).

In the examples shown in FIG. 8, the camera gain has a predetermined threshold value so that the quantization scale ratio is controlled in two steps. It is also possible to change the quantization scale ratio in proportion to the camera gain.

Figure 9:
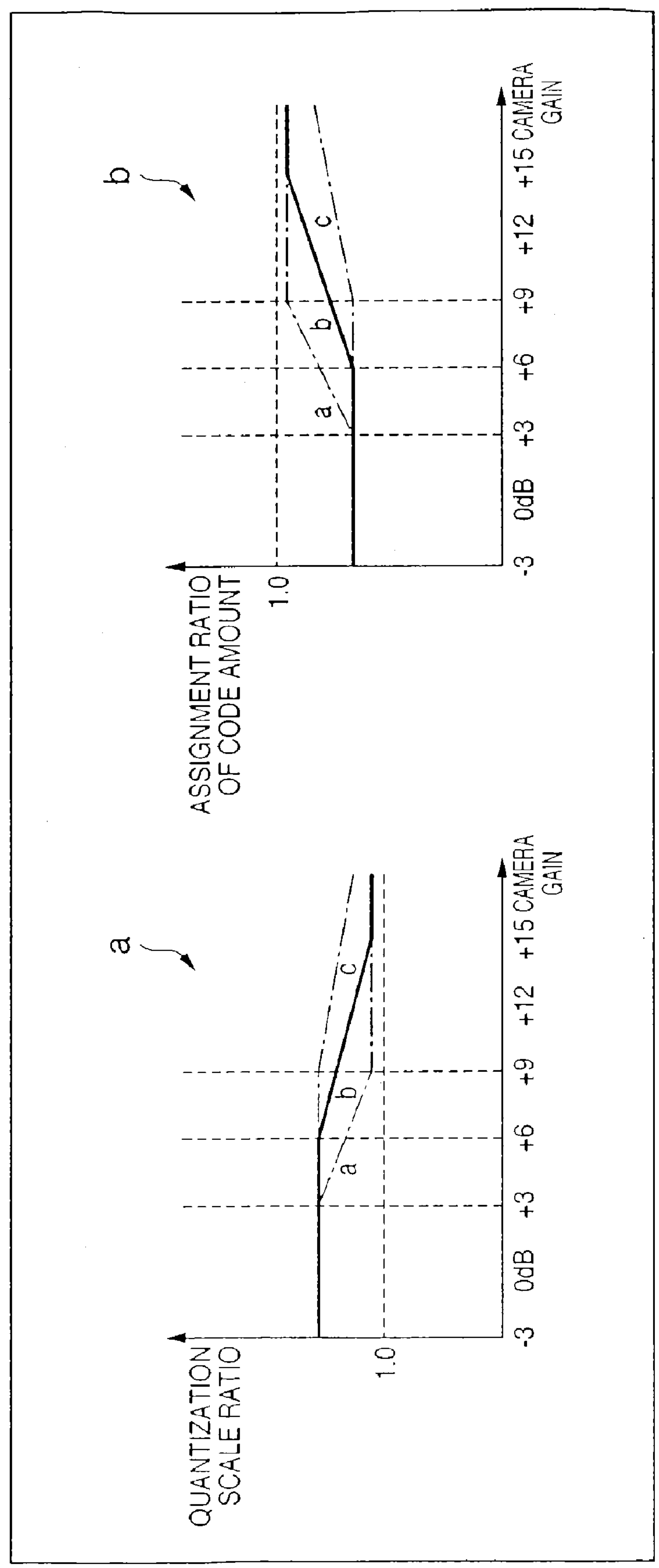
FIG. 9 shows graphs showing another example of assigned code amount control according to the second embodiment.

FIG. 9 shows examples of control of assignment ratio of code amount proportional to the camera gain in accordance with sharpness setting. A graph a of FIG. 9 shows quantization scale ratio control for control of assignment ratio of code amount. For the illustrative convenience, the graph a of FIG. 9 shows only the control characteristic of B-pictures. Symbols a, b, and c indicate changes in the quantization scale ratio of B-pictures according to the camera gain in correspondence with the sharpness setting intensities (high, medium, and low). The threshold value of the change in the quantization scale changes between a, b, and c. When the camera gain exceeds +3, +6, and +9 dB, the quantization scale ratio of B-pictures decreases in accordance with the camera gain. As a result, the generated code amount ratio of B-pictures increases. Additionally, the tilt of the change in the quantization scale changes between a, b, and c. The higher the sharpness is, the more rapidly the quantization scale ratio decreases upon increasing the gain. In this embodiment, the threshold value of quantization scale ratio change corresponding to the camera gain is changed in accordance with the sharpness intensity. In addition, the quantization scale ratio decrease rate is also changed in accordance with the sharpness intensity. If the sharpness is high, the quantization scale ratio decreases from a low camera gain.

A graph b of FIG. 9 shows a state wherein the assigned code amount ratio changes upon quantization scale ratio control proportional to the camera gain in accordance with the sharpness setting in the graph a of FIG. 9. As in the graph a of FIG. 9, symbols a, b, and c indicate changes in the assigned code amount ratio of B-pictures according to the camera gain in correspondence with the sharpness setting intensities (high, medium, and low).

As described above, in this embodiment, the assigned code amount ratio of P- and B-pictures increases in accordance with the camera gain and sharpness setting. This allows to suppress loss of the peak of the noise component upon increasing the gain when P- and B-pictures are encoded. This arrangement can reduce a luminance flicker in reproducing encoded image data.

In this embodiment, the flicker suppression control circuit 716 controls spatial or temporal smoothing or spatial and temporal smoothing of the above-described smoothing circuit 724. When the arrangement to control the smoothing processing combines with the above-described arrangement to control code amount assignment, a synergy effect can be expected.

In a detailed arrangement of smoothing control, the smoothing circuit 724 executes smoothing at an intensity corresponding to the camera gain and sharpness setting to suppress the peak of the noise component itself and decrease the luminance peak due to the noise component of I-pictures. This allows to reduce the difference from the decrease in the luminance peak of noise upon encoding P- and B-pictures. As a result, a luminance flicker between the pictures can be suppressed. Additionally, this smoothing processing also suppresses the noise component input to the P- and B-pictures. This further suppresses the decrease in the luminance peak of noise dependent on encoding by an increase in the code amount assignment ratio.

Figure 10:
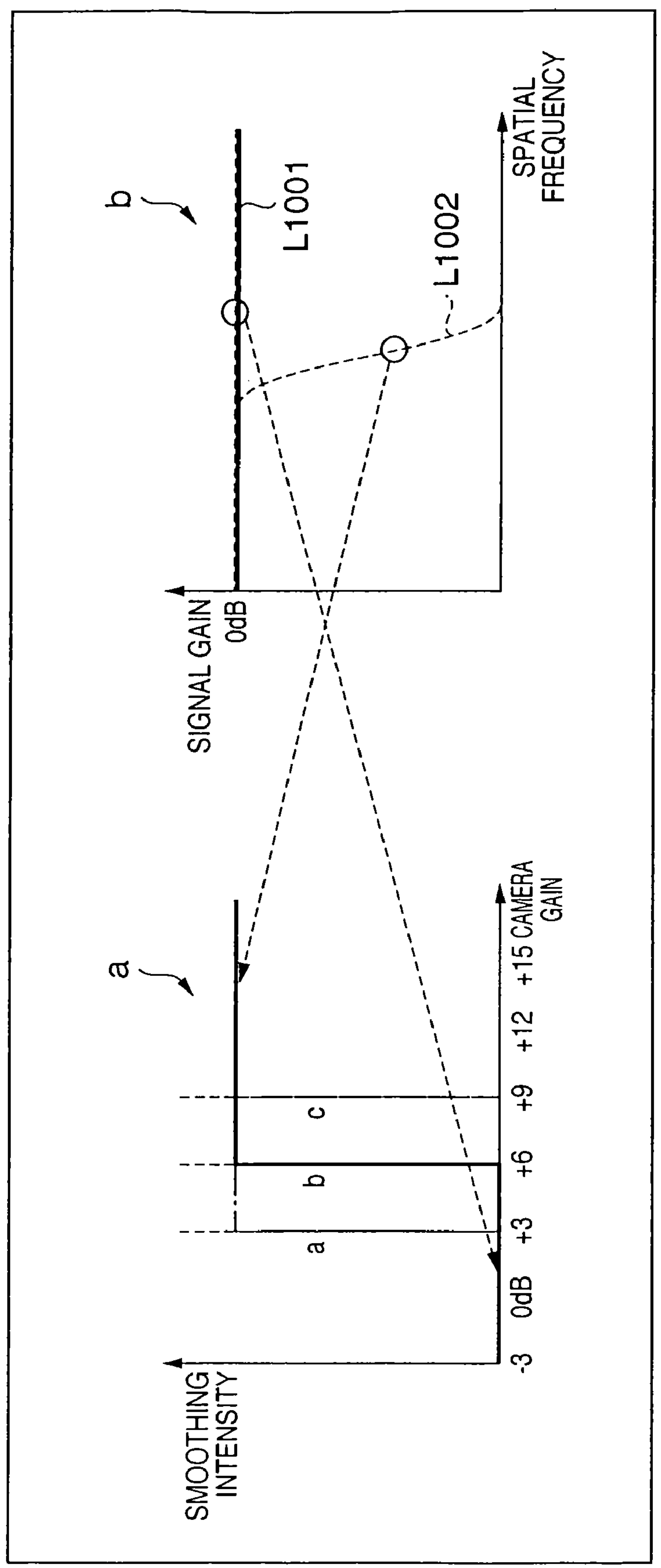
FIG. 10 shows graphs showing an example of smoothing intensity control according to the second embodiment.

A graph a of FIG. 10 shows an example of smoothing intensity control according to the camera gain and sharpness setting. Symbols a, b, and c indicate smoothing intensities according to the camera gain in correspondence with the sharpness setting intensities (high, medium, and low). The threshold value of the change in the smoothing intensity changes between a, b, and c. When the camera gain exceeds +3, +6, and +9 dB, the smoothing processing is executed.

A graph b of FIG. 10 shows the band characteristic of the spatial filter corresponding to the change in the smoothing intensity in the graph a of FIG. 10. L1001 indicates a band characteristic obtained when no smoothing processing is executed. This characteristic corresponds to the region without smoothing processing (smoothing intensity: 0) in the graph a of FIG. 10. L1002 indicates a band characteristic obtained when smoothing processing is executed. This characteristic corresponds to the region where the smoothing processing is effective in the graph a of FIG. 10.

Figure 11:
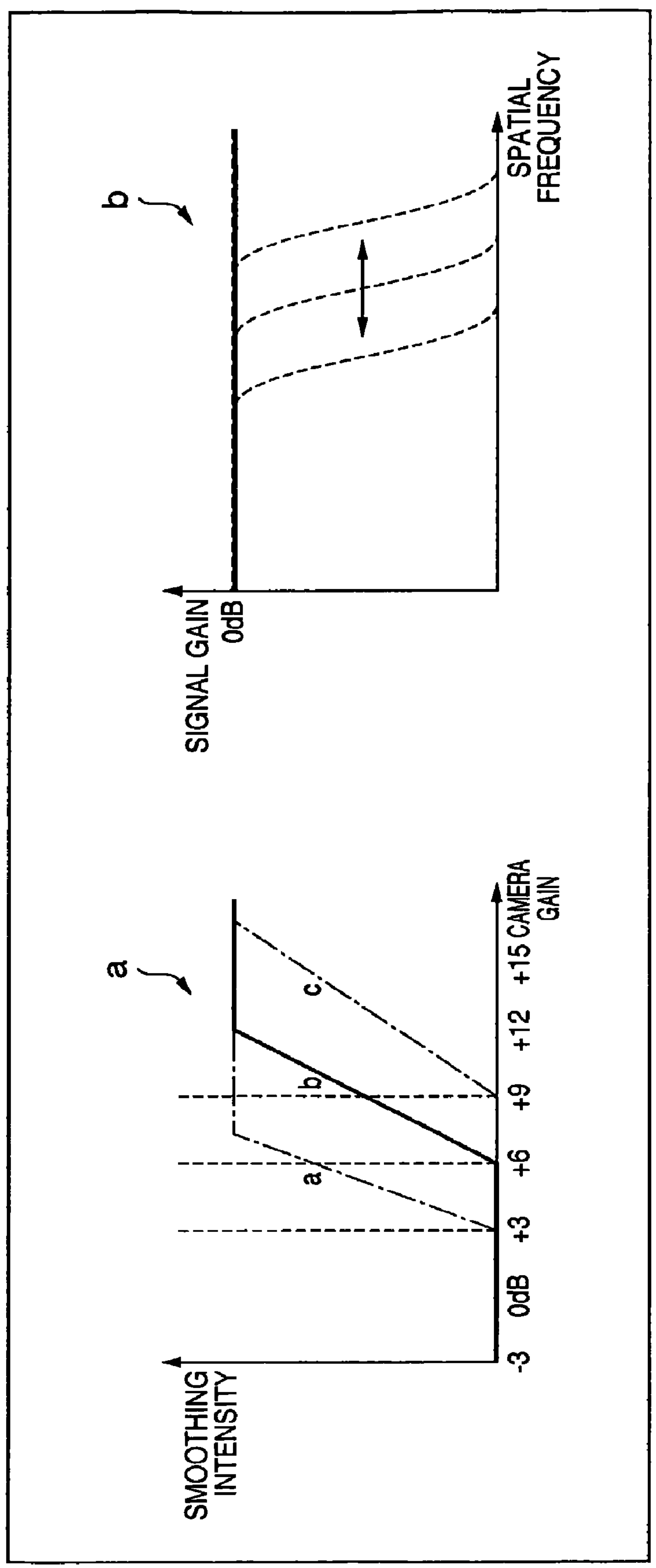
FIG. 11 shows graphs showing another example of smoothing intensity control according to the second embodiment.

In the examples shown in FIG. 10, the camera gain has a predetermined threshold value so that the smoothing characteristic is changed in two steps (whole band is passed in one mode). It is also possible to change the smoothing intensity in proportion to the camera gain. A graph a of FIG. 11 shows smoothing intensity control proportional to the camera gain in accordance with sharpness setting. Symbols a, b, and c indicate smoothing intensities according to the camera gain in correspondence with the sharpness setting intensities (high, medium, and low). The threshold value of the change in the smoothing intensity changes between a, b, and c. When the camera gain exceeds +3, +6, and +9 dB, the smoothing intensity increases up to a predetermined upper limit in accordance with the camera gain. The tilt of the increases changes depending on the sharpness setting. If the sharpness setting is high, the smoothing intensity is high even at a low camera gain. A graph b of FIG. 11 shows the band characteristic of the spatial filter corresponding to the change in the smoothing intensity in the graph a of FIG. 11. When the camera gain is +6 dB to +12 dB, the passband of the spatial filter narrows stepwise in accordance with the camera gain.

As described above, in this embodiment, the assigned code amount ratio of each picture type and the image signal smoothing intensity are controlled collectively in accordance with the camera gain and sharpness setting. This allows to effectively reduce the noise flicker while minimizing an adverse effect such as a decrease in the resolution or an afterimage due to smoothing. Even when a camera apparatus for business use is used for photographing containing noise as a photographic effect, the flicker can be reduced while making the most of the effect of noise.

[Third Embodiment]

Figure 12:
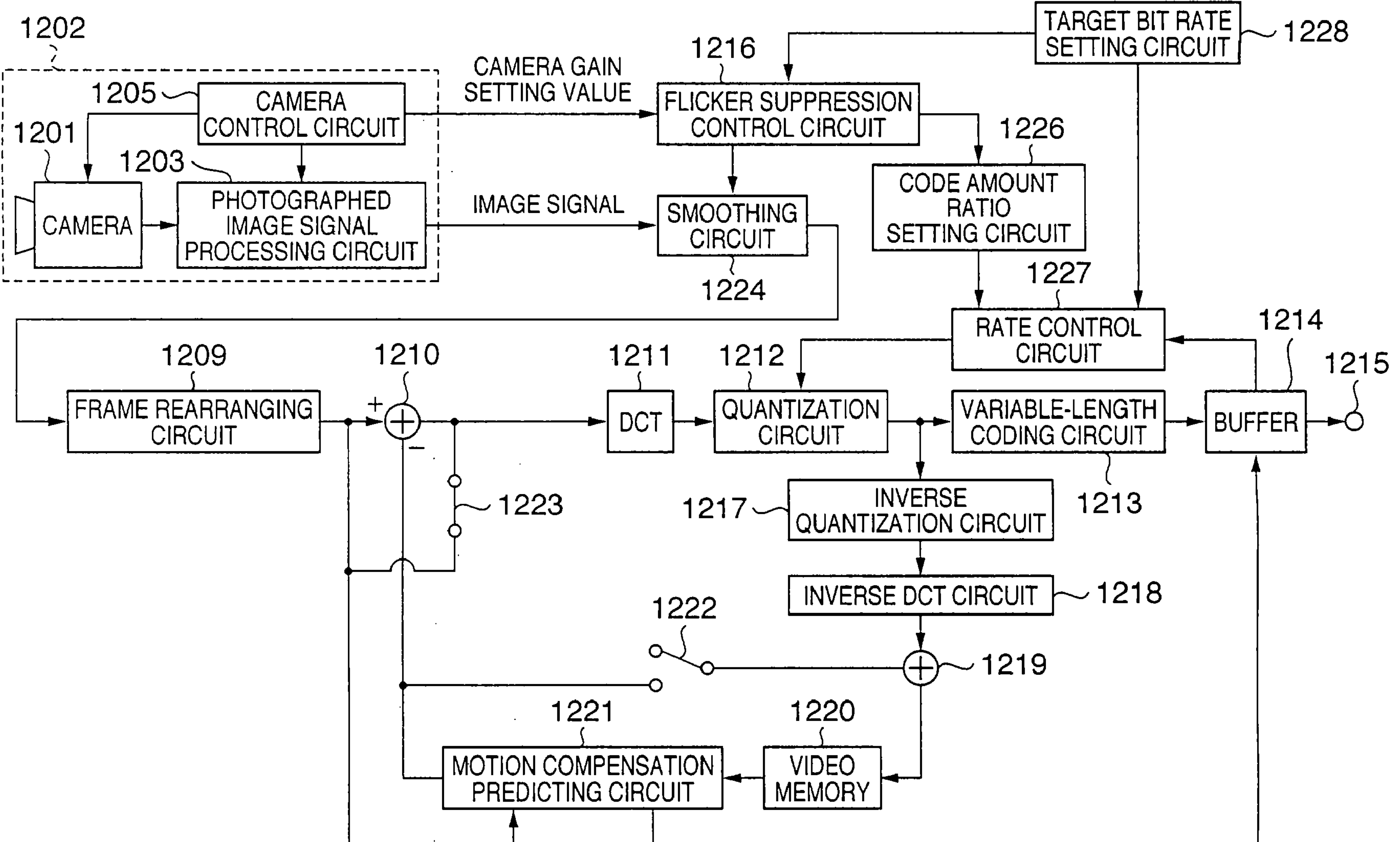
FIG. 12 is a block diagram of a digital video camera according to the third embodiment.

FIG. 12 is a block diagram showing, as the third embodiment, a digital video camera according to still another embodiment of an image signal processing apparatus of the present invention. Reference numeral 1202 denotes a camera unit; and 1201, a camera including a lens optical system and a photo-electric conversion unit such as a CCD. An analog moving image signal photographed by the camera 1201 undergoes processing such as A/D-conversion, pixel interpolation, color conversion, and γ-conversion by a photographed image signal processing circuit 1203.

A camera control circuit 1225 executes processing such as exposure control of the camera 1201 on the basis of, for example, the brightness of the photographed image. The camera control circuit 1225 controls the amplifier gain of the photographed image signal processing circuit 1203 as needed, as in the first embodiment.

The photographed image signal processing circuit 1203 supplies its output to a smoothing circuit 1224 as an image signal from the camera unit 1202. The smoothing circuit 1224 includes a variable-band special filter that limits the spatial band of an image signal, a variable temporal filter that executes temporal smoothing of each pixel, or a combination thereof. The smoothing circuit 1224 has already been described in detail in the first embodiment, and a repetitive description will be omitted here.

The output from the smoothing circuit 1224 is supplied to a frame rearranging circuit 1209 as image data to be encoded. The frame rearranging circuit 1209 rearranges frames in an encoding order.

For I-pictures, a difference circuit 1210 outputs the image data itself to a DCT circuit 1211. For P- and B-pictures, the difference circuit 1210 calculates the difference value between the image data and a predicted image and outputs the difference value to the DCT circuit 1211 by selecting a switch 1223. The DCT circuit 1211 converts the image data into a DCT coefficient. A quantization circuit 1212 quantizes the DCT coefficient by using a predetermined quantization scale Q.

A variable-length coding circuit 1213, for example, entropy-encodes the quantization coefficient output from the quantization circuit 1212 and outputs it as encoded data. A buffer 1214 temporarily saves the generated encoded data to control the encoding rate. The encoded data stored in the buffer 1214 is read out at a predetermined rate and output from a terminal 1215 as compression-encoded data. It is possible to efficiently record the output compression-encoded data on a recording medium such as a tape, disc, or semiconductor memory or efficiently transmit the compression-encoded data by using a network or commutation channel.

On the other hand, the coefficient data quantized by the quantization circuit 1212 undergoes inverse quantization by an inverse quantization circuit 1211 and inverse DCT by an inverse DCT circuit 1218 to obtain predicted image data. For I-pictures, an adding circuit 1219 saves data after inverse DCT directly in a video memory 1220. For P- and B-pictures, the adding circuit 1219 adds the predicted image to the P- and B-pictures and saves it in the video memory 1220 as locally decoded image data. A motion compensation predicting circuit 1221 compares the locally decoded image data saved in the video memory 1220 with the input image data. For P-pictures, predicted image data with motion compensation in the forward direction is generated and supplied to the above-described difference circuit 1210. For B-pictures, predicted image data with bidirectional motion compensation is generated and supplied to the above-described difference circuit 1210. The motion compensation predicting circuit 1221 also supplies the generated image data to the adding circuit 1219 as a predicted image for next local decoding.

A target bit rate setting circuit 1228 calculates a target bit rate in accordance with, for example, a user's encoding mode selection instruction and supplies the information to a rate control circuit 1227 and flicker suppression control circuit 1216.

The rate control circuit 1227 executes code amount assignment control of a picture to be encoded for a target encoding rate in accordance with information such as a past generated code amount and buffer fill factor obtained from the buffer 1214, the information from the above-described target bit rate setting circuit 1228, and the setting value of a code amount ratio setting circuit 1226 (to be described later). At this time, the rate control circuit 1227 controls the quantization circuit 1212 by deciding the quantization scale Q based on a code amount assigned to each picture type. The generated code amount after quantization changes between the I-, P-, and B-pictures. The quantization scale Q is therefore changed in accordance with the picture type.

The flicker suppression control circuit 1216 as a characteristic feature of this embodiment controls smoothing processing of the smoothing circuit 1224 and the code amount ratio setting circuit 1226 in accordance with a camera gain setting value supplied from the camera control circuit 1225 and the target bit rate value supplied from the above-described target bit rate setting circuit 1228. The flicker suppression control circuit 1216 controls the code amount ratio setting circuit 1226 to change the code amount ratio to be assigned to each picture type, thereby suppressing a luminance flicker upon increasing the gain.

Figure 13:
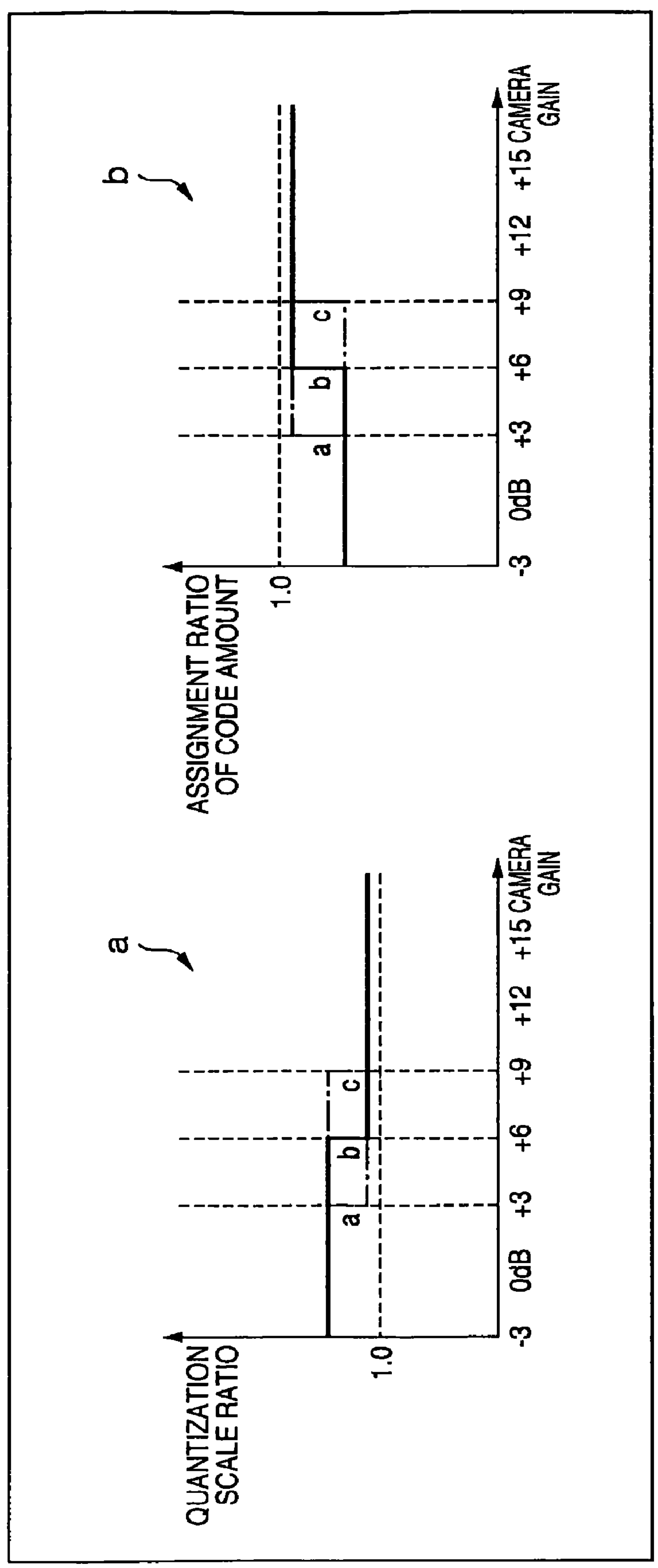
FIG. 13 shows graphs showing an example of assigned code amount control according to the third embodiment.

FIG. 13 shows graphs a and b showing control of assignment ratio of code amount by the camera gain and target bit rate value. The graph a of FIG. 13 shows quantization scale ratio control for control of assignment ratio of code amount. For the illustrative convenience, the graph a of FIG. 13 shows only the control characteristic of B-pictures. Symbols a, b, and c indicate changes in the quantization scale ratio of B-pictures according to the camera gain in correspondence with the target bit rates (low, medium, and high). The threshold value of the change in the quantization scale changes between a, b, and c. When the camera gain exceeds +3, +6, and +9 dB, the quantization scale ratio of B-pictures decreases. As a result, the generated code amount ratio of B-pictures increases. Generally, the lower the target bit rate is, the larger the decrease in the luminance peak caused by the noise component upon encoding of P- and B-pictures is. Hence, the luminance flicker readily becomes noticeable. Hence, in this embodiment, the threshold value of quantization scale ratio change corresponding to the camera gain is changed in accordance with the target bit rate. If the target bit rate is low, the quantization scale ratio decreases from a low camera gain.

The graph b of FIG. 13 shows a state wherein the assigned code amount ratio changes upon quantization scale ratio control according to the camera gain and target bit rate value in the graph a of FIG. 13. As in the graph a of FIG. 13, symbols a, b, and c indicate changes in the assigned code amount ratio of B-pictures according to the camera gain in correspondence with the target bit rates (low, medium, and high).

In the examples shown in FIG. 13, the camera gain has a predetermined threshold value so that the quantization scale ratio is controlled in two steps. It is also possible to change the quantization scale ratio in proportion to the camera gain.

Figure 14:
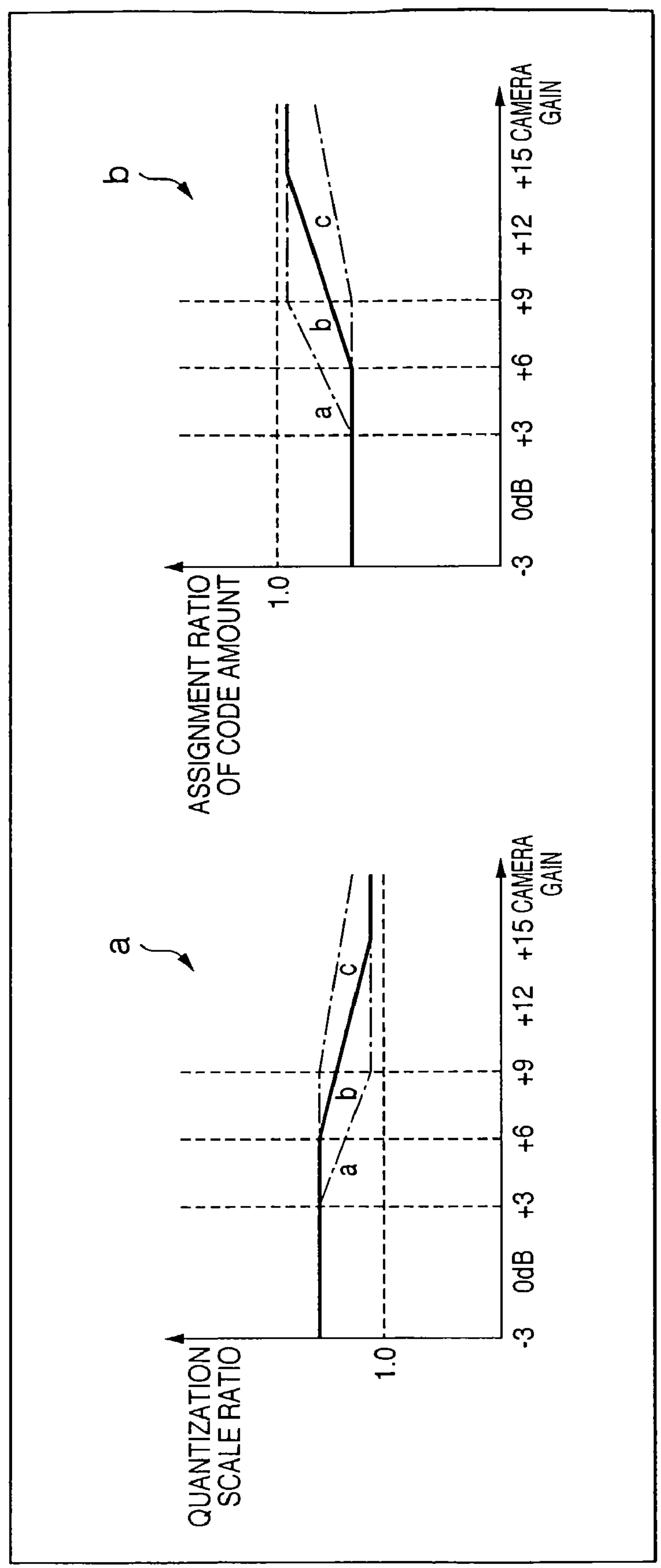
FIG. 14 shows graphs showing another example of assigned code amount control according to the third embodiment.

FIG. 14 shows examples of control of assignment ratio of code amount proportional to the camera gain in accordance with the target bit rate value. A graph a of FIG. 14 shows quantization scale ratio control for control of assignment ratio of code amount. For the illustrative convenience, the graph a of FIG. 14 shows only the control characteristic of B-pictures. Symbols a, b, and c indicate changes in the quantization scale ratio of B-pictures according to the camera gain in correspondence with the target bit rates (low, medium, and high). The threshold value of the change in the quantization scale changes between a, b, and c. When the camera gain exceeds +3, +6, and +9 dB, the quantization scale ratio of B-pictures decreases in accordance with the camera gain. As a result, the generated code amount ratio of B-pictures increases. Additionally, the tilt of the change in the quantization scale changes between a, b, and c. The lower the target bit rate is, the more rapidly the quantization scale ratio decreases upon increasing the gain. In this embodiment, the threshold value of quantization scale ratio change corresponding to the camera gain is changed in accordance with the target bit rate. In addition, the quantization scale ratio decrease rate is also changed in accordance with the target bit rate. If the target bit rate is low, the quantization scale ratio decreases from a low camera gain.

A graph b of FIG. 14 shows a state wherein the assigned code amount ratio changes upon quantization scale ratio control proportional to the camera gain in accordance with the target bit rate value in the graph a of FIG. 14. As in the graph a of FIG. 14, symbols a, b, and c indicate changes in the assigned code amount ratio of B-pictures according to the camera gain in correspondence with the target bit rates (low, medium, and high).

As described above, in this embodiment, the assigned code amount ratio of P- and B-pictures increases as the camera gain increases. This allows to suppress loss of the peak of the noise component upon increasing the gain when P- and B-pictures are encoded. This arrangement can reduce a luminance flicker in reproducing encoded image data.

In this embodiment, the flicker suppression control circuit 1216 controls spatial or temporal smoothing or spatial and temporal smoothing of the above-described smoothing circuit 1224. When the arrangement to control the smoothing processing combines with the above-described arrangement to control code amount assignment, a synergy effect can be expected.

In a detailed arrangement of smoothing control, the smoothing circuit 1224 executes smoothing at an intensity corresponding to the camera gain and target bit rate value to suppress the peak of the noise component itself and decrease the luminance peak due to the noise component of I-pictures. This allows to reduce the difference from the decrease in the luminance peak of noise upon encoding P- and B-pictures. As a result, a luminance flicker between the pictures can be suppressed. Additionally, this smoothing processing also suppresses the noise component input to the P- and B-pictures. This further suppresses the decrease in the luminance peak of noise dependent on encoding by an increase in the code amount assignment ratio.

The contents of smoothing intensity control according to the camera gain and target bit rate value is the same as those of smoothing control according to the camera gain and sharpness setting described with reference to FIGS. 10 and 11, and a description thereof will be omitted.

As described above, in this embodiment, the assigned code amount ratio of each picture type and the image signal smoothing intensity are controlled collectively in accordance with the camera gain and target bit rate value. This allows to effectively reduce the noise flicker while minimizing an adverse effect such as a decrease in the resolution or an afterimage due to smoothing. Even when a camera apparatus for business use is used for photographing containing noise as a photographic effect, the flicker can be reduced while making the most of the effect of noise.

According to the present invention described above, the assigned code amount ratio of each picture type and the image signal smoothing intensity are controlled collectively in accordance with the camera gain. This allows to effectively reduce the luminance flicker by noise while minimizing an adverse effect such as a decrease in the resolution or an afterimage due to smoothing even when the S/N ratio of an image photographed at an increased gain is low. Additionally, it is possible to reduce the luminance flicker while making the most of the effect of noise even in photographing an image containing noise that is intentionally added to obtain a photographic effect.

[Other Embodiment]

The functions of the processes of the camera control circuit, flicker suppression control circuit, code amount ratio setting circuit, and rate control circuit of the above-described embodiments may be implemented by causing the CPU (Central Processing Unit) of a computer to read out a program to implement the function of each process from a memory and execute the program.

Examples of the memory the CPU accesses are nonvolatile memories such as an HDD, optical disc, and flash memory, read-only recording media such as a CD-ROM, volatile memories except a RAM, and computer-readable/writable recording media by combinations thereof.

The program to implement the functions of the processes of the camera control circuit, flicker suppression control circuit, code amount ratio setting circuit, and rate control circuit of the above-described embodiments may be recorded on a computer-readable recording medium such that a computer system can load and execute the program recorded on the recording medium to do the processes. The "computer system" includes an OS and hardware such as peripheral devices. More specifically, the functions of the above-described embodiments may be implemented when the program read out from a storage medium is written in the memory of a function expansion board inserted into a computer or a function expansion unit connected to a computer, and the CPU of the function expansion board or function expansion unit partially or wholly performs actual processing on the basis of the instructions of the program.

The "computer-readable recording medium" indicates a portable medium including an optical disc such as a CD-ROM or DVD and a semiconductor memory card, or a storage device such as a hard disc incorporated in a computer system. The "computer-readable recording medium" also includes a device that holds a program for a predetermined time, like a volatile memory (RAM) in a compute system serving as a server or client when a program is transmitted through a network such as the Internet or a communication line such as a telephone line.

The program may be transmitted from a computer system that stores it in a storage device to another computer system through a transmission medium or transmission wave in a transmission medium. The "transmission medium" to transmit the program indicates a medium having a function of transmitting information, like a network (communication network) such as the Internet or a communication line such as a telephone line.

The program may implement some of the above-described functions. The program may be a so-called differential file (differential program) implemented by combining the above-described functions with an already recorded program.

A program product such as a computer-readable recording medium that records the program is also applicable as an embodiment of the present invention. The present invention incorporates the program, recording medium, transmission medium, and program product.

The embodiments of the present invention have been described above in detail with reference to the accompanying drawings. Detailed arrangements are not limited to the embodiments and also include a design without departing from the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-324784, filed Nov. 9, 2005 which is hereby incorporated by reference herein in its entirety.

The invention claimed is:

1. An image signal processing apparatus for classifying pictures contained in an image signal into a plurality of picture types and compression-encoding the image signal, comprising:

an acquisition unit configured to acquire a gain setting value for the image signal;

a compression encoding unit configured to execute compression-encoding the image signal;

an adjustment unit configured to adjust a code amount to be assigned to each picture type in said compression encoding unit; and a control unit configured to control an assignment ratio between the code amount to be assigned to one picture type and the code amount to be assigned to each of other picture types, by changing the assignment ratio in accordance with the gain setting value acquired by said acquisition unit, wherein said control unit increases the assignment ratio of the code amount to be assigned to a picture that is to be encoded by inter-picture prediction with respect to the code amount to be assigned to a picture to be intra-coded when the gain setting value is larger than a predetermined value, and wherein said control unit changes the assignment ratio of the code amount to be assigned to the picture to be encoded by inter-picture prediction with respect to the code amount to be assigned to the picture to be intra-encoded, in proportion to the gain setting value.

2. The image signal processing apparatus according to claim 1, further comprising a smoothing unit configured to execute smoothing processing of the image signal, wherein said compression encoding unit is provided on a subsequent stage of said smoothing unit, and said control unit further controls an intensity of smoothing processing by said smoothing unit in addition to the assignment ratio, by changing the intensity in accordance with the gain setting value acquired by said acquisition unit.

3. The image signal processing apparatus according to claim 2, wherein said smoothing unit executes spatial smoothing processing, temporal smoothing processing, or smoothing processing of both types.

4. The image signal processing apparatus according to claim 2, further comprising a designation unit configured to designate a target bit rate of compression encoding of said compression encoding unit, wherein said control unit changes, in accordance with the target bit rate designated by said designation unit in addition to the gain setting value, the intensity of smoothing processing and the assignment ratio.

5. The image signal processing apparatus according to claim 1, wherein the assignment ratio is changed by changing a ratio of a quantization scale representation value for a picture to be intra-encoded to a quantization scale representation value for a picture to be encoded by inter-picture prediction.

6. The image signal processing apparatus according to claim 1, further comprising a camera unit configured to generate the image signal by photographing, said camera unit having an arrangement to execute gain adjustment of the generated image signal and output the gain setting value, wherein said acquisition unit acquires the gain setting value output from said camera unit.

7. The image signal processing apparatus according to claim 1, further comprising a designation unit configured to designate a target bit rate of compression encoding of said compression encoding unit, wherein said control unit changes the assignment ratio in accordance with the target bit rate designated by said designation unit in addition to the gain setting value.

8. The image signal processing apparatus according to claim 1, wherein said acquisition unit acquires the gain setting value for the image signal from a camera, and the image signal is generated by said camera.

9. An image signal processing apparatus for classifying pictures contained in an image signal into a plurality of picture types and compression encoding the image signal, comprising:

an acquisition unit configured to acquire a gain setting value of gain adjustment for the image signal and a sharpness setting value of sharpness adjustment for the image signal;

a smoothing unit configured to execute smoothing processing of the image signal;

a compression encoding unit, provided on a subsequent stage of said smoothing unit, configured to execute compression-encoding the image signal;

an adjustment unit configured to adjust a code amount to be assigned to each picture type in said compression encoding unit; and a control unit configured to control an intensity of smoothing processing by said smoothing unit and an assignment ratio between the code amount to be assigned to one picture type and the code amount to be assigned to each of other picture types, by changing the intensity in accordance with the gain setting value and the sharpness setting value acquired by said acquisition unit, wherein said control unit increases the assignment ratio of the code amount to be assigned a picture that is to be encoded by inter-picture prediction with respect to the code amount to be assigned to a picture to be intra-encoded when the gain setting value is larger than a predetermined value defined by the sharpness setting value, and wherein said control unit changes the assignment ratio of the code amount to be assigned to the picture to be encoded by inter-picture prediction with respect to the code amount to be assigned to the picture to be intra-encoded, in proportion to the gain setting value at a rate defined by the sharpness setting value.

10. The image signal processing apparatus according to claim 9, wherein the assignment ratio is changed by changing a ratio of a quantization scale representation value for a picture to be intra encoded to a quantization scale representation value for a picture to be encoded by inter-picture prediction.

11. The image signal processing apparatus according to claim 9, wherein said smoothing unit executes spatial smoothing processing, temporal smoothing processing, or smoothing processing of both types.

12. The image signal processing apparatus according to claim 11, wherein said control unit executes smoothing processing of the image signal when the gain setting value is larger than a predetermined value defined by the sharpness setting value.

13. The image signal processing apparatus according to claim 12, wherein said control unit increases an intensity of smoothing processing in proportion to the gain setting value at a rate defined by the sharpness setting value.

14. The image signal processing apparatus according to claim 9, further comprising a camera unit configured to generate the image signal by photographing, said camera unit having an arrangement to execute gain adjustment and sharpness adjustment of the generated image signal and output the gain setting value and the sharpness setting value, wherein said acquisition unit acquires the gain setting value and the sharpness setting value output from said camera unit.

15. The image signal processing apparatus according to claim 9, wherein said acquisition unit acquires the gain setting value and the sharpness setting value from a camera, and the image signal is generated by said camera.

16. A control method of an image signal processing apparatus for classifying pictures contained in an image signal into a plurality of picture types and compression-encoding the image signal, comprising steps of:

acquiring a gain setting value for the image signal;

setting an assignment ratio of code amount for each picture type;

compression-encoding the image signal in accordance with the set ratio; and changing, in accordance with the acquired gain setting value, an assignment ratio between the code amount to be assigned to one picture type and the code amount to be assigned to each of other picture types, wherein in said changing step, the assignment ratio of the code amount to be assigned to a picture that is to be encoded by inter-picture prediction with respect to the code amount to be assigned to a picture to be intra-encoded is increased, when the gain setting value is larger than a predetermined value, and wherein the assignment ratio of the code amount to be assigned to the picture to be encoded by inter-picture prediction with respect to the code amount to be assigned to the picture to be intra-encoded is changed, in proportion to the gain setting value.

* * * * *